US011613617B2

(12) United States Patent
Yamazaki et al.

(10) Patent No.: US 11,613,617 B2
(45) Date of Patent: Mar. 28, 2023

(54) MULTILAYER FILM

(75) Inventors: Atsushi Yamazaki, Inuyama (JP);
Kyoko Inagaki, Otsu (JP); Takeshi Ookawa, Inuyama (JP); Yoshiharu Morihara, Inuyama (JP); Youji Takatsu, Inuyama (JP); Masanori Kobayashi, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 13/991,098

(22) PCT Filed: Nov. 30, 2011

(86) PCT No.: PCT/JP2011/077726
§ 371 (c)(1),
(2), (4) Date: May 31, 2013

(87) PCT Pub. No.: WO2012/074030
PCT Pub. Date: Jun. 7, 2012

(65) Prior Publication Data
US 2013/0260144 A1  Oct. 3, 2013

(30) Foreign Application Priority Data

Dec. 1, 2010 (JP) .............................. JP2010-268524
Jun. 6, 2011 (JP) .............................. JP2011-126321
Jun. 23, 2011 (JP) .............................. JP2011-139420

(51) Int. Cl.
*C08J 7/048* (2020.01)
*C09D 139/04* (2006.01)
*C09D 133/14* (2006.01)
*C08J 7/043* (2020.01)
*C08J 7/046* (2020.01)
*B32B 27/30* (2006.01)

(52) U.S. Cl.
CPC ............. *C08J 7/048* (2020.01); *B32B 27/308* (2013.01); *C08J 7/043* (2020.01); *C08J 7/046* (2020.01); *C09D 133/14* (2013.01); *C09D 139/04* (2013.01); *Y10T 428/265* (2015.01)

(58) Field of Classification Search
CPC .......... E01F 9/014; G09F 13/04; B32B 27/30; B32B 27/308; B32B 27/40; B32B 9/00; B65D 81/34; C08J 2375/04; C08J 2433/00; C08J 7/042; C09D 133/14; C09D 139/04; Y10T 428/265
USPC ................................................. 428/410, 420
See application file for complete search history.

(56) References Cited

U.S. PATENT DOCUMENTS 5,387,642 A     2/1995  Blum et al.
5,691,002 A *  11/1997  Oda et al. .................. 427/407.1
5,725,958 A *   3/1998  Matsuda et al. .............. 428/446
5,766,751 A     6/1998  Kotani et al.
5,770,301 A     6/1998  Murai et al.
6,146,750 A    11/2000  Kotani et al.
6,316,093 B1   11/2001  Kotani et al.
6,395,209 B2    5/2002  Yoshida et al.
6,426,135 B1    7/2002  Kotani et al.
8,124,236 B2    2/2012  Okawara et al.
2001/0016260 A1  8/2001  Yoshida et al.
2004/0241484 A1* 12/2004  Uchida ................ C09D 133/08
                                                                428/522
2005/0123747 A1  6/2005  Yoshida et al.
2006/0121204 A1  6/2006  Nakae et al.
2006/0188712 A1  8/2006  Okada et al.
2007/0092717 A1  4/2007  Yoshida et al.
2007/0224402 A1  9/2007  Yoshida et al.
2009/0214854 A1*  8/2009  Okawara ................ C09D 5/028
                                                                428/323
2010/0015431 A1  1/2010  Matsui et al.
2010/0015449 A1  1/2010  Obu et al.
2010/0036050 A1  2/2010  Iwa et al.
2010/0304135 A1  12/2010  Okada et al.
2011/0129654 A1  6/2011  Yoshida et al.
2012/0149841 A1  6/2012  Yamada et al.
2012/0315462 A1  12/2012  Matsui et al.

FOREIGN PATENT DOCUMENTS

EP       0 905 174 A2     3/1999
EP       1 479 513 A1    11/2004
EP       2 103 640 A1     9/2009
JP       H02-050837 A     2/1990
(Continued)

OTHER PUBLICATIONS

Translation of JP 11-179836 retrieved Aug. 14, 2014.*
Machine translation of JP 2006052298, retrieved Aug. 14, 2014.*
Machine translation of JP 2001026749, retrieved Aug. 14, 2014.*
Machine translation of JP 2004-351369, retrieved May 4, 2020.*
Machine translation of JP 2005-139436, retrieved May 4, 2020.*
European Patent Office, Extended European Search Report in European Patent Application No. 11846034.4 (dated Mar. 20, 2014).
Japanese Patent Office, Notice of Reasons for Refusal in Japanese Patent Application No. 2009-297973 (dated Jul. 29, 2013).
Japanse Patent Office, International Search Report in International Patent Application No. PCT/JP2011/077726 (dated Jan. 31, 2012).
Japanese Patent Office, Notice of Reasons for Rejection in Japanese Patent Application No. 2011-262879 (dated Jun. 23, 2015).

(Continued)

*Primary Examiner* — Michael B Nelson
(74) *Attorney, Agent, or Firm* — Leydig, Voit & Mayer, Ltd.

(57) ABSTRACT

The invention provides a multilayer film comprising a substrate film and a coating layer arranged on at least one surface of the substrate film, wherein the coating layer contains an oxazoline group and comprises an acrylic resin, the coating layer has a thickness (D) of 5-150 nm, and the ratio (P1/P2) of the peak intensity (P1) of a peak that has an absorption maximum in a region of $1655\pm10$ cm$^{-1}$ to the peak intensity (P2) of a peak that has an absorption maximum in a range of $1580\pm10$ cm$^{-1}$ in the total reflection infrared absorption spectrum of the coating layer and the thickness (D) of the coating layer fulfill the relationship represented by the formula: $0.03 \leq (P1/P2)/D \leq 0.15$.

11 Claims, No Drawings

(56) References Cited

FOREIGN PATENT DOCUMENTS

| | | | |
|---|---|---|---|
| JP | H04-337310 A | | 11/1992 |
| JP | H09-241829 A | | 9/1997 |
| JP | H11-179836 A | | 7/1999 |
| JP | 2000-043182 A | | 2/2000 |
| JP | 2001-026749 A | | 1/2001 |
| JP | 2002-301787 A | | 10/2002 |
| JP | 2002-309022 A | | 10/2002 |
| JP | 3441594 B2 | | 9/2003 |
| JP | 2003-320610 A | | 11/2003 |
| JP | 2004-351369 | * | 12/2004 |
| JP | 2005-047964 A | | 2/2005 |
| JP | 3681426 B2 | | 8/2005 |
| JP | 2005-271467 A | | 10/2005 |
| JP | 2005-139436 | * | 12/2005 |
| JP | 2005-349769 A | | 12/2005 |
| JP | 2006-052298 A | | 2/2006 |
| JP | 2007-171892 A | | 7/2007 |
| JP | 2008-297527 A | | 12/2008 |
| JP | 2009-084446 A | | 4/2009 |
| JP | 2010-012745 A | | 1/2010 |
| JP | 2010-016286 A | | 1/2010 |
| WO | WO 2005/075587 A1 | | 8/2005 |
| WO | WO 2007/013303 A1 | | 2/2007 |
| WO | WO 2008/059925 A1 | | 5/2008 |
| WO | WO 2010/001750 A1 | | 1/2010 |
| WO | WO 2011/021500 A1 | | 2/2011 |

OTHER PUBLICATIONS

Japanese Patent Office, Notice for the Submission of Information by Third Parties in Japanese Patent Application No. 2011-262879 (Nov. 10, 2015).

Japanese Patent Office, Notification of Reasons for Rejection in Japanese Patent Application No. 2011-262879 (dated Feb. 2, 2016).

Japanese Patent Office, Notice of Reasons for Rejection in Japanese Patent Application No. 2011-262889 (dated May 12, 2015).

Japanese Patent Office, Submission of Information by Third Parties in Japanese Patent Application No. 2011-262879 (Mar. 17, 2015).

Japanese Patent Office, Notification of Reasons for Rejection in Japanese Patent Application No. 2012-138755 (dated Aug. 23, 2016).

European Patent Office, Communication Pursuant to Article 94(3) EPC in European Patent Application No. 11846034.4 (dated May 9, 2018).

Kyoeisha Chemical Co., Ltd., Kyoeisha Chemical Product Brochure for Specialty Chemicals, p. 16 (2018).

* cited by examiner

MULTILAYER FILM

CROSS-REFERENCE TO RELATED APPLICATIONS

This patent application is the U.S. national phase of International Patent Application No. PCT/JP2011/077726, filed Nov. 30, 2011, which claims the benefit of Japanese Patent Application No. 2010-268524, filed on Dec. 1, 2010, Japanese Patent Application No. 2011-126321, filed on Jun. 6, 2011, and Japanese Patent Application No. 2011-139420, filed on Jun. 23, 2011, which are incorporated by reference in their entireties herein.

TECHNICAL FIELD

The present invention relates to a multilayer film to be used in packaging fields for foodstuffs, drugs, industrial products, and the like. In detail, the present invention relates to a multilayer film that can exhibit improved interlayer adhesion properties of inorganic thin film layers and that can exhibit good gas-barrier properties and adhesion properties (lamination strength) even if the multilayer film is subjected to a retort treatment, in the case where the multilayer film is made to be a gas-barrier multilayer film having inorganic thin film layers.

BACKGROUND ART

Packaging materials to be used for foodstuffs, drugs, and the like are required to have properties for shutting gases such as oxygen and steam, that is, gas-barrier properties, in order to suppress oxidation of proteins, fats and oils, preserve their taste and freshness, and keep the efficacy of drugs. Gas-barrier materials to be used for electronic devices and electronic parts such as solar cells and organic EL devices are required to have higher gas-barrier properties than packaging materials for foodstuffs or the like.

Conventionally, in applications for foodstuffs that are required to shut out various gases such as steam and oxygen, gas-barrier multilayer bodies obtained by forming metal thin films of aluminum or the like, or inorganic thin films of silicon oxide and aluminum oxide on the surface of a substrate film of plastic have been usually employed. Among them, those having a thin film (inorganic thin film layer) of an inorganic oxide such as silicon oxide, aluminum oxide, and a mixture thereof have been widely used because they are transparent and the contents can be checked therethrough.

However, the gas-barrier multilayer bodies are likely to be locally heated to a high temperature in a formation step, therefore, the substrate is damaged, or decomposition or degassing occurs in low molecular weight parts or portions of additives such as a plasticizer, and due to the occurrence, defects, pinholes, and the like are formed in inorganic thin film layers to result in deterioration in gas-barrier properties in some cases. Further, there is also a problem that inorganic thin film layers are cracked during a post-treatment such as printing, lamination and packaging with packaging materials and cracks are formed, and gas-barrier properties are lowered. In particular, in a printing step, it is known that the gas-barrier properties are lowered due to the effect of a coloring material (pigment) in an ink composition and the damage on the inorganic thin film layer is more serious. In the application of packaging materials or the like for foodstuffs to which a retort treatment is carried out, there is a problem that if inorganic thin film layers are damaged, the subsequent retort treatment allows to considerably lower gas-barrier properties and lower the interlayer adhesion properties between an inorganic thin film layer and a resin adjacent to the thin layer, thereby causing leakage of the contents.

To deal with the problems of the deterioration in barrier properties attributed to a printing step, a method for forming a protection layer on a vapor deposition thin film layer has been known. To form a protection layer, conventionally, polyester resins and polyurethane-urea resins have been used. These resins have molecular weight of tens of thousands and are used in the form of a one-component or two-component coating liquid while being dissolved in a solvent. However, a protection layer immediately after formation by the application of such a coating liquid is inferior in the resistance against a solvent used in a printing ink, and owing to that, the transfer property of the printing ink is worsened and printings with high designing properties are not obtained.

Besides the gas-barrier multilayer bodies as described above, many gas-barrier films obtained by coating a resin composition on a substrate film are proposed. Particularly, coating agents using polyvinyl alcohol or an ethylene-vinyl alcohol copolymer that has high oxygen-barrier properties by itself have been used for practical applications.

Gas-barrier films obtained by coating a substrate film of plastic with a layer of a vinyl alcohol-based resin that is blended with an inorganic layer-based compound such as montmorillonite and that has gas-barrier properties are also proposed. Examples include an example in which a layer composed of polyvinyl alcohol, a crosslinking agent, and an inorganic layered compound and having gas-barrier properties is formed on a substrate film; and an example in which a layer composed of an ethylene-polyvinyl alcohol copolymer, a water-soluble zirconium-based crosslinking agent and an inorganic layered compound, and having gas-barrier properties is formed on a substrate film (e.g., Patent Documents 1 and 2). These gas-barrier films reliably keeps moisture resistance under high humidity and water resistance in the condition of merely boiling or the like since a resin is crosslinked, but in the case where the gas-barrier films are subjected to a retort treatment under pressure at 120 to 130° C., the gas-barrier properties and lamination strength are lowered and sufficiently satisfied performances are not obtained.

On the other hand, as a method for improving the defects of gas-barrier multilayer bodies having an inorganic film formed, an attempt to further form a layer having gas-barrier properties on the inorganic thin film has been made. For example, proposed is a method for coating an inorganic thin film with a water-soluble polymer, an inorganic layered compound and a metal alkoxide or its hydrolyzed product and forming a composite of an inorganic substance containing the inorganic layered compound with the water-soluble polymer on the inorganic thin film by a sol-gel method (e.g., Patent Document 3). According to this method, excellent properties can be obtained even after a retort treatment; however, since the stability of the solution to be used for coating is low, there are problems; that is, the properties of the coating differ at the starting and the finishing (for example, in the case of an industrially distributed roll film, between the outer circumferential part and inner circumferential part of the roll), or the properties differ depending on slight temperature difference in the width direction of the film during drying or heat treatment, or quality is considerably fluctuated depending on the environments in the production. Further, it is pointed out as a problem that since a film formed by coating by a sol-gel method is poor in flexibility, if bending power or an impact is applied to the film, pinholes are easily formed and thus the gas-barrier properties are deteriorated in some cases.

In view of the above-mentioned state of the art, there is desired such improvement as to make it possible to form a resin layer on an inorganic thin film layer by a coating method not involving sol-gel reaction or the like, that is, a coating method using mainly a resin and involving crosslinking reaction at the time of coating. As a gas-barrier multilayer body thus improved, there are disclosed a gas barrier multilayer body in which an inorganic thin film is coated with a resin layer containing an inorganic layered compound having a specific particle diameter and aspect ratio (e.g., Patent Document 4) and a gas barrier multilayer body in which an inorganic thin film is coated with a barrier resin layer containing a silane coupling agent (e.g., Patent Document 5).

Further, as another method for improving the deterioration of gas-barrier multilayer bodies having an inorganic thin film formed, there is proposed a method that involves forming a coating layer containing various aqueous polyurethane resins, polyester resins, or mixtures of polyurethane and polyester between a polyester substrate film and an inorganic thin film formed by, for example, a vapor deposition method (e.g., Patent Document 6). Still further, in order to improve the water resistance of the coating layer under heat and humidity conditions, it is proposed to form a coating layer containing various aqueous polyurethane and/or aqueous polyester resins in combination with an oxazoline group-containing water-soluble polymer (e.g., Patent Document 7). In this case, the water resistance is improved by adding the oxazoline group to cause crosslinking. In addition, in order to prevent the deterioration of the inorganic thin film due to oligomer precipitation from the substrate film, known is a method that involves forming a covering layer containing a mixture of various aqueous acrylic resins and oxazoline group-containing water-soluble polymers (e.g., Patent Document 8).

PRIOR ART DOCUMENTS

Patent Documents

Patent Document 1: JP 2005-349769 A
Patent Document 2: JP 2008-297527 A
Patent Document 3: JP 2000-43182 A
Patent Document 4: Japanese Patent No. 3681426
Patent Document 5: Japanese Patent No. 3441594
Patent Document 6: JP 02-50837 A
Patent Document 7: JP 2002-301787 A
Patent Document 8: JP 11-179836 A

DISCLOSURE OF THE INVENTION

Problems to be Solved by the Invention

However, all of the methods described above can improve the properties under conditions of high humidity and merely boiling, but cannot provide sufficiently satisfactory barrier properties and lamination strength under severe condition such as a retort treatment and cannot simultaneously satisfy both of the gas-barrier properties and printing qualities such as designing properties in the case where a printing process is carried out.

In the background of the above-mentioned problems of conventional techniques, an object of the present invention is to provide a multilayer film that is excellent in gas-barrier properties and that exhibits good adhesive properties without interlayer peeling not only in a normal condition but also even after a severe retort treatment, that has both of satisfactory gas-barrier properties and printing quality such as designing properties even if a printing process is carried out, and that is easy to be produced economically.

Solutions to the Problems

The present inventors have made various investigations for solving the above-mentioned problems, and consequently have found that, in a multilayer film having at least a coating layer on both faces or one face of a substrate film, when the coating layer comprises an oxazoline group and an acrylic resin and has a thickness (D) adjusted within a specific range and a relation of the thickness (D) with a ratio (P1/P2) of specified two peak-intensities in the total reflection infrared absorption spectrum within a specific range, excellent gas-barrier properties and good adhesion properties without causing interlayer peeling can be obtained not only in a normal condition but also after a retort treatment, in the case where a gas-barrier multilayer film is obtained by forming an inorganic thin film layer on the coating layer, and further, a protection layer formed from a composition A comprising a polymer (a) containing not less than 10% by mass of (meth)acrylic acid, a polyurethane-urea resin (b) having an ether bond, and a specific crosslinking agent (c) or a composition B comprising a polyester resin (d) having a weight average molecular weight of 22,000 to 40,000 and a polyisocyanate (e) can be provided on the inorganic thin film layer to thereby suppress deterioration of gas-barrier properties and to keep good printing ink transfer properties to reliably give printing qualities such as designing properties, at the time of printing process, and these findings have led to the completion of the present invention.

Regarding a coating layer to be provided on a plastic substrate film, it has been conventionally considered to be desirable for improving the resistance to heat and humidity of the coating layer to form a highly crosslinked structure at the time of forming a coating layer by mixing a crosslinking agent and a resin having a functional group reactive with the crosslinking agent; however, the present invention is completed based on the concept against such conventional technical knowledge. That is, in the present invention, an oxazoline group-containing resin and an acrylic resin are used as resins for forming a coating layer which is to be interposed between a substrate film and an inorganic thin film, the oxazoline group is properly reacted to a specific extent and left, and thus the coating layer comprises the oxazoline group and the acrylic resin. Accordingly, the crosslinked structure and the coating flexibility can be controlled and as a result, gas barrier properties can be maintained even after a retort treatment. In the present invention, the thickness of the coating layer is adjusted within a range of 5 to 150 nm, so that it is expected to be possible to form an inorganic thin film layer excellent in uniformity.

In additional, the present invention has been completed based on a finding of a specific composition which can exhibit excellent solvent resistance to a printing ink while keeping gas-barrier properties, as a material for forming a protection layer on an inorganic thin film layer.

That is, the present invention has the following configurations.

(1) A multilayer film obtained by forming a coating layer on at least one face of a substrate film, wherein said coating layer comprises an oxazoline group, comprises an acrylic resin, and has a thickness (D) of 5 to 150 nm and a relation of the thickness (D) with the ratio (P1/P2) of the peak-intensity (P1) of the peak having the absorption maximum in a region of $1655\pm10$ cm$^{-1}$ and the peak-intensity (P2) of the peak having the absorption maximum in a region of $1580\pm10$ cm$^{-1}$ in the total reflection infrared absorption spectrum of the coating layer satisfies the following inequality.

$$0.03 \leq (P1/P2)/D \leq 0.15$$

(2) The multilayer film according to above (1), wherein an inorganic thin film layer is laminated on said coating layer.

(3) The multilayer film according to above (1), wherein an inorganic thin film layer is laminated on said coating layer, a protection layer is further laminated on the inorganic thin film layer, and said protection layer is formed from a resin composition A for protection layers comprising a polymer (a) of either a (meth)acrylic acid homopolymer or a (meth)acrylic acid/(meth)acrylic acid ester copolymer containing not less than 10% by mass of (meth)acrylic acid; a polyurethane-urea resin (b) having an ether bond; and at least one crosslinking agent (c) selected from epoxy resins, polyisocyanates, and silane coupling agents.

(4) The multilayer film according to above (1), wherein an inorganic thin film layer is laminated on said coating layer, a protection layer is further laminated on said coating layer, and said protection layer is formed from a resin composition B for protection layers comprising a polymer (d) having a weight-average molecular weight of 22,000 to 40,000 and a polyisocyanate (e).

(5) The multilayer film according to any of above (1) to (4), wherein said coating layer is formed from a resin composition for coating layers comprising an oxazoline group-containing resin and an acrylic resin as indispensable ingredients.

(6) The multilayer film according to above (5), wherein the oxazoline group-containing resin in said resin composition for coating layers has an amount of the oxazoline group of 5.1 to 9.0 mmol/g.

(7) The multilayer film according to above (5) or (6), wherein said resin composition for coating layers comprises a urethane resin.

(8) The multilayer film according to above (7), wherein said urethane resin comprises a carboxyl group and the acid value thereof is 10 to 40 mgKOH/g.

(9) The multilayer film according to any of above (5) to (8), wherein the acrylic resin in said resin composition for coating layers comprises a carboxyl group and the acid value thereof is not more than 40 mgKOH/g.

(10) The multilayer film according to any of above (7) to (9), wherein the amount of the oxazoline group-containing resin is 20 to 70% by mass, the amount of the acrylic resin is 10 to 60% by mass, and the amount of the urethane resin is 10 to 60% by mass based on 100% by mass in total of said oxazoline group-containing resin, said acrylic resin, and said urethane resin.

(11) The multilayer film according to any of above (2) to (10), wherein said inorganic thin film layer is a layer consisting of a composite oxide of silicon oxide and aluminum oxide.

Effect of the Invention

The present invention can provide a gas-barrier multilayer film that can exert excellent gas barrier properties (barrier properties against oxygen and steam) and that can exhibit good lamination strength (adhesion strength) without causing interlayer peeling not only in a normal condition but also after a retort treatment. The gas-barrier multilayer film of the present invention keeps both of gas-barrier properties and printing quality such as designing properties without damage on the inorganic thin film layer even if being subjected to a printing process. The gas-barrier multilayer film of the present invention is simply produced and thus is excellent in economy and also production stability, and it is easy to provide uniform properties.

The gas-barrier multilayer film of the present invention is useful for packaging applications for various foodstuffs, drugs and industrial products, and industrial applications for solar cells, electronic paper, organic EL devices, semiconductor devices, and the like in which these devices are set under high-temperature and high-humidity environments and in which longtime stable gas-barrier properties and durability are required.

MODE FOR CARRYING OUT THE INVENTION

A multilayer film of the present invention is obtained by layering at least a coating layer on one face or both faces of a substrate film. The present invention also includes aspects in which an inorganic thin film layer and a protection layer are laminated in this order on the coating layer with or without another layer interposed therebetween. Hereinafter, a plastic substrate film and the respective layers to be formed thereon will be described one by one.

[Substrate Film]

A substrate film to be used in the present invention is a plastic substrate film and for example, a film obtained by melt-extruding a plastic and if necessary, stretching in the longitudinal direction and/or width direction, cooling and thermally fixing the extruded plastic can be used. Examples of the plastic include polyamides represented by nylon-4,6, nylon6, nylon-6,6, nylon12, and like; polyesters represented by poly(ethylene terephthalate), poly(butylene terephthalate), polyethylene-2,6-naphthalate, and the like; polyolefins represented by polyethylene, polypropylene, polybutene, and the like; as well as poly(vinyl chloride), poly(vinylidene chloride), poly(vinyl alcohol), all aromatic polyamides, polyamide imides, polyimides, polyether imides, polysulfones, polystyrenes, and poly(lactic acid). Among them, polyesters are preferable in terms of heat resistance, dimensional stability and transparency, and particularly poly(ethylene terephthalate) and copolymers obtained by copolymerization of poly(ethylene terephthalate) with another ingredient 0 are preferable.

Those having arbitrary thickness can be used as the substrate film in accordance with desired purposes, such as mechanical strength and transparency, and applications without any particular limit of the thickness, but the thickness is usually recommended to be 5 to 250 μm, and in the case of using the substrate film as a packaging material, the thickness is desirably 10 to 60 μm.

The transparency of the substrate film is not particularly limited, but in the case of using the substrate film as a packaging material for which transparency is required, one having a light transmittance of 50% or higher is preferable.

The substrate film may be either a monolayer-based film made of one kind of plastic or a multilayer-based film laminated two or more kinds of plastic films. In the case of a multilayer-based film, the type, the number of layers, a lamination method and the like of a multilayer film are not particularly limited and conventionally known methods may be selected arbitrarily in accordance with the purposes.

The substrate film may be subjected to a surface treatment such as a corona discharge treatment, glow discharge, a flame treatment, and a surface roughening treatment to an extent that the purposes of the present invention are not impaired, and also subjected to a conventionally known anchor treatment, printing, decoration, and the like.

[Coating Layer]

In the present invention, the coating layer comprises an oxazoline group and comprises an acrylic resin. For that, the coating layer is preferably formed from a resin composition for coating layers including an oxazoline group-containing resin and an acrylic resin as indispensable ingredients. The thickness (D) of the coating layer is within a specific range, and the peak-intensity ratio (P1/P2) of specific two peaks in the total reflection infrared absorption spectrum of the coating layer and the thickness (D) satisfy a specific relation. Accordingly, excellent gas-barrier properties and lamination strength can be maintained even after a retort treatment.

In detail, it has been conventionally considered to be desirable for improving the resistance to heat and humidity of the coating layer to positively introduce a highly cross-linked structure; however, in the present invention, not merely by introducing a highly crosslinked structure but by allowing the coating layer to have the above-mentioned configuration, the gas-barrier properties and lamination strength at the time of a retort treatment are improved. Hereinafter, the action mechanism for maintaining excellent gas-barrier properties and lamination strength even after a retort treatment owing to the above-mentioned configuration of the coating layer will be described.

Conventionally, in the case of a multilayer film having an inorganic thin film layer, if the adhesion properties between the inorganic thin film layer and a substrate film or between the inorganic thin film layer and a coating layer formed on the substrate film are insufficient, water penetrates the interlayer at the time of a retort treatment and peeling occurs in the interface with the inorganic thin film layer. The inorganic thin film layer is cracked or blistered from the peeling part as a starting point and as a result, it leads to a problem that the gas-barrier properties and lamination strength are lowered.

The interlayer peeling at the time of a retort treatment also occurs between the substrate film and the coating layer. That is, at the time of retort treatment, a plastic such as a polyester resin composing the substrate film and a resin in the coating layer are hydrolyzed and bonds are sometimes broken. As a result, an adhesion defect is caused between the substrate film and the coating layer and it sometimes leads to lowering of the gas-barrier properties and lamination strength as described above.

Further, at the time of a retort treatment, a below-mentioned sealant layer formed on the substrate film or the inorganic thin film layer is exposed to heat and humidity environments to cause dimensional change, and stress load is applied to the neighboring inorganic thin film layer. As a result, the inorganic thin film layer is broken and the barrier properties are lowered in some cases.

The coating layer in the present invention comprises an oxazoline group. The oxazoline group is an un-reacted oxazoline group and usually, it is introduced by an oxazoline group-containing resin in a resin composition for coating layers composing a coating layer.

An oxazoline group has high affinity with an inorganic thin film of a metal oxide and is reactive with an oxygen deficient portion of an inorganic oxide or a metal hydroxide generated at the time of forming an inorganic thin film layer, and therefore, shows strong adhesion properties to the inorganic thin film layer. Further, the un-reacted oxazoline group existing in the coating layer is reacted with the carboxylic terminals formed by hydrolysis of the substrate film and the coating layer to form crosslinks. Owing to the above-mentioned actions, in the present invention, the adhesion properties between the respective layers of the inorganic thin film layer-coating layer-substrate film are strong, and as a result, the inorganic thin film layer is prevented from cracking and deterioration and the gas-barrier properties and lamination strength can be maintained.

In order to exert the function-effect, in the present invention, it is required that the ratio (P1/P2) of the peak-intensity (P1) of the peak having the absorption maximum in a region of $1655\pm10$ cm$^{-1}$ and the peak-intensity (P2) of the peak having the absorption maximum in a region of $1580\pm10$ cm$^{-1}$ in the total reflection infrared absorption spectrum of the coating layer, and the thickness (D) (nm) of the coating layer have a relation satisfying the following inequality:

$$0.03 \leq (P1/P2)/D \leq 0.15$$

Herein, the peak having the absorption maximum in a region of $1655\pm10$ cm$^{-1}$ is derived from the oxazoline group and the peak having the absorption maximum in a region of $1580\pm10$ cm$^{-1}$ is derived from a polyester. In the inequality, the value defined as (P1/P2)/D is preferably not less than 0.035 and more preferably not less than 0.04, and preferably not more than 0.13 and more preferably not more than 0.10. If the value defined as (P1/P2)/D is less than 0.03, the amount of the oxazoline group is small so that sufficient gas-barrier properties and lamination strength cannot be obtained in some cases after a retort treatment. On the other hand, if the value defined as (P1/P2)/D exceeds 0.15, the amount of the oxazoline group is so high as to lower the cohesive force or to make the thickness too thin in relation to the oxazoline group amount to obtain sufficient interlayer adhesion properties after a retort treatment. The measurement of the total reflection infrared absorption spectrum of the coating layer can be carried out by the method described in, for example, below-mentioned Examples.

In order to exert the above-mentioned function-effect, in the present invention, the thickness (D) of the coating layer is adjusted to be 5 to 150 nm. Accordingly, the thickness of the coating layer can be controlled to be uniform, and as a result, an inorganic thin film layer can be deposited densely. Further, the cohesive force of the coating layer itself is improved and the adhesion properties between the respective layers of the inorganic thin film layer-coating layer-substrate film are increased, and thus the water resistance of the coating layer can be increased. The thickness (D) of the coating layer is preferably not less than 10 nm, more preferably not less than 30, and even more preferably not less than 50 nm, and preferably not more than 140 nm, more preferably not more than 110 nm, and even more preferably not more than 100 nm. If the thickness of the coating layer exceeds 150 nm, the cohesive force of the coating layer is insufficient, the uniformity of the coating layer is also lowered so that the gas-barrier properties are sometimes not exhibited sufficiently at the time of a retort treatment, and not only the gas-barrier properties are lowered but also the production cost is increased to result in economical disadvantage. On the other hand, if the thickness of the coating layer is less than 5 nm, sufficient interlayer adhesion properties to the substrate film cannot be obtained.

For example, even in the case where the resin composition for coating layers consists of only an oxazoline group-containing resin, if the resin composition contains a sufficient amount of the oxazoline group so as to satisfy the above-mentioned inequality defining the range of (P1/P2)/D, good retort resistance may possibly be exhibited. However, in the case where the coating layer is exposed to a more severe retort treatment at high temperature for a long time, the cohesive force of the coating layer itself is deficient and it is inevitable to cause a damage on the inorganic thin film layer due to deformation of the coating layer itself. Therefore, in the present invention, an acrylic resin is used as an indispensable ingredient for the resin composition for coating layers and the acrylic resin is thus contained in the coating layer so that the coating layer could be sufficiently durable to the more severe retort treatment. The acrylic resin is contained to thereby improve the cohesive force of the coating layer itself and as a result, to increase water resistance. Further, in the case where the acrylic resin has a carboxyl group, the carboxyl group is properly reacted with the oxazoline group (concretely, in a manner of keeping the above-mentioned value of (P1/P2)/D within the range), so that the coating layer can have a partially crosslinked structure and it can be expected to further improve the water resistance.

In the present invention, if the resin composition for coating layers comprises a urethane resin, particularly a urethane resin having a carboxyl group, the retort resistance of the coating layer can be improved. That is, the carboxyl group of the urethane resin and the oxazoline group are properly reacted with each other (concretely, in a manner of keeping the above-mentioned value of (P1/P2)/D within the range), so that the coating layer can have a partially crosslinked structure and also is provided with flexibility owing to the urethane resin, and therefore, both of improvement in water resistance and stress relaxation for the inorganic thin film layer tend to be satisfied simultaneously.

The multilayer film of the present invention can maintain excellent gas-barrier properties and interlayer adhesion properties (lamination strength) even after a retort treatment by forming the above-mentioned coating layer.

Next, the constituent ingredients of the resin composition for coating layers for forming the coating layer will be described in detail.

(Oxazoline Group-Containing Resin)

The resin composition for coating layers preferably comprises an oxazoline group-containing resin. Examples of the oxazoline group-containing resin may include oxazoline group-containing polymers obtained by copolymerizing an oxazoline group-containing polymerizable unsaturated monomer with, if necessary, another polymerizable unsaturated monomer by a conventionally known method (e.g., solution polymerization and emulsion polymerization).

Examples of the oxazoline group-containing polymerizable unsaturated monomer may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These monomers may be used alone, or 2 or more of them may be used in combination.

Examples of another polymerizable unsaturated monomer may include alkyl or cycloalkyl esters of (meth)acrylic acid, with 1 to 24 carbon atoms, such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; hydroxyalkyl esters of (meth)acrylic acid, with 2 to 8 carbon atoms, such as 2-hydroxyethyl (meth)acrylate and hydroxypropyl (meth)acrylate; vinyl aromatic compounds such as styrene and vinyltoluene; (meth)acrylamide, dimethylaminopropyl (meth)acrylamide, dimethylaminoethyl (meth)acrylate, and adducts of glycidyl (meth)acrylate and amines; polyethylene glycol (meth)acrylate; N-vinylpyrrolidone, ethylene, butadiene, chloroprene, vinyl propionate, vinyl acetate, and (meth)acrylonitrile. These monomers may be used alone, or 2 or more of them may be used in combination.

Another polymerizable unsaturated monomer is preferably a hydrophilic monomer in terms of improvement in compatibility with other resins, wettability, crosslinking reaction efficiency, and transparency of the coating layer, for the oxazoline group-containing resin to be obtained as a water-soluble resin. Examples of the hydrophilic monomer include 2-hydroxyethyl (meth)acrylate, monomers having polyethylene glycol chains such as methoxypolyethylene glycol (meth)acrylate and monoester compounds of (meth)acrylic acid and polyethylene glycol, 2-aminoethyl (meth)acrylate and a salt thereof, (meth)acrylamide, N-methylol (meth)acrylamide, N-(2-hydroxyethyl)(meth)acrylamide, (meth)acrylonitrile, and styrenesulfonic acid sodium. Among them, preferable examples are monomers having polyethylene glycol chains such as methoxypolyethylene glycol (meth)acrylate and monoester compounds of (meth)acrylic acid and polyethylene glycol which have high solubility in water (the molecular weight of a polyethylene glycol chain to be introduced is preferably 150 to 700 and particularly, in terms of water resistance, it is preferably 150 to 200, and in terms of compatibility with other resins and transparency of the coating layer, it is preferably 300 to 700).

In a copolymer of the oxazoline group-containing polymerizable unsaturated monomer and another polymerizable unsaturated monomer, the composition mole ratio of the oxazoline group-containing polymerizable unsaturated monomer is preferably 30 to 70 mol % and more preferably 40 to 65 mol %.

The oxazoline group-containing resin preferably has an oxazoline group content of 5.1 to 9.0 mmol/g. It is more preferably in a range of 6.0 to 8.0 mmol/g. Regarding use of an oxazoline group-containing resin for a coating layer, an example of use of a resin having an oxazoline group in a content of about 5.0 mmol/g is conventionally proposed (e.g., Patent Document 8); however, in the present invention, a resin having a relatively high amount of an oxazoline group is used. It is because use of a resin having a high amount of an oxazoline group simultaneously forms the crosslinked structure in the coating layer and leaves the oxazoline group in the coating layer, and as a result, the water resistance and the flexibility can be made more controllable in good balance.

The number average molecular weight of the oxazoline group-containing resin is preferably in a range of 20000 to 50000 and more preferably 25000 to 45000 in terms of exhibition of the flexibility and cohesive force of the coating layer. If the number average molecular weight is less than 20000, the restraining force is increased in the case where the crosslinked structure is formed, and therefore, the coating layer cannot have sufficient flexibility at the time of a retort treatment and the stress load on the inorganic thin film layer may possibly be increased. On the other hand, if the number average molecular weight exceeds 50000, the cohesive force of the coating layer is not sufficient, and therefore, the water resistance may possibly be lowered.

The content of the oxazoline group-containing resin in the coating layer is preferably 20 to 70% by mass, more preferably 30 to 60% by mass, and even more preferably 40 to 50% by mass based on 100% by mass of all of the resin ingredients (the total of the oxazoline group-containing resin, the acrylic resin and the urethane resin) in the resin composition for coating layers. If the content of the oxazoline group-containing resin is less than 20% by mass, it tends not to sufficiently exhibit water-proof adhesive properties and the flexibility by the oxazoline group, and on the other hand, if it exceeds 70% by mass, the value of (P1/P2)/D described above tends to exceed the upper limit of the above-mentioned range and as a result, the cohesive force of the coating layer is insufficient and the water resistance may possibly be lowered.

(Acrylic Resin)

The resin composition for coating layers contains an acrylic resin. As the acrylic resin, an aqueous acrylic resin containing alkyl acrylate and/or alkyl methacrylate (hereinafter, sometimes collectively referred to as "alkyl (meth)acrylate") as a main ingredient is used. Specific examples of the aqueous acrylic resin preferably include water-soluble resins or water-dispersible resins which contain usually 40 to 95 mol % (preferably 45 to 90 mol % and more preferably 50 to 85 mol %) of alkyl (meth)acrylate and usually 5 to 60 mol % (preferably 10 to 55 mol % and more preferably 15 to 50 mol %) of a vinyl monomer which is copolymerizable and has a specific functional group.

Examples of the alkyl group in the above-mentioned alkyl (meth)acrylate include a methyl group, an ethyl group, a n-propyl group, an isopropyl group, a n-butyl group, an isobutyl group, a 2-ethylhexyl group, a lauryl group, a stearyl group, and a cyclohexyl group.

Examples of the specific functional group in the vinyl monomer include a carboxyl group, an acid anhydride group, a sulfonic acid group or a salt thereof, an amide group or an alkylolated-amide group, an amino group (including a substituted amino group), an alkylolated-amino group or a salt thereof, a hydroxyl group, and an epoxy group, and particularly, a carboxyl group, an acid anhydride group, an epoxy group, and the like are preferable. These functional groups may be used alone, or 2 or more of them may be used in combination.

In the aqueous acrylic resin, adjustment of the content of the alkyl (meth)acrylate to be not less than 40 mol % makes the coatability, the coating strength, and the blocking resistance particularly good. On the other hand, adjustment of the content of the alkyl (meth)acrylate to be not more than 95 mol % and introduction of not less than 5 mol % of the compound having a specific functional group as a copolymerizable ingredient into the aqueous acrylic resin can make solubilization or dispersion of the aqueous acrylic resin in water easy and keep such a state stable for a long duration, and as a result, the adhesion properties of the coating layer and the substrate film, and the strength, the water resistance, the chemical resistance of the coating layer can be improved owing to reaction in the coating layer.

Examples of the vinyl monomer having a carboxyl group or an acid anhydride group include acrylic acid, methacrylic acid, itaconic acid, and maleic acid as well as alkali metal salts, alkaline earth metal salts and ammonium salts thereof, and also maleic anhydride.

Examples of the vinyl monomer having a sulfonic acid group or a salt thereof include vinylsulfonic acid, styrenesulfonic acid, and metals salts (e.g., sodium salt) and ammonium salts of these sulfonic acids.

Examples of the vinyl monomer having an amide group or an alkylolated amide group include acrylamide, methacrylamide, N-methylmethacrylamide, methylolated acrylamide, methylolated methacrylamide, ureido vinyl ether, β-ureidoisobutyl vinyl ether, and ureidoethyl acrylate.

Examples of the vinyl monomer having an amino group (including a substituted amino group) or an alkylolated amino group, or salts thereof include diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, and those obtained by methylolating the amino group of the above monomers or quaternizing the above monomers with an alkyl halide, dimethylsulfuric acid, sultone, or the like.

Examples of the vinyl monomer having a hydroxyl group may include β-hydroxyethyl acrylate, β-hydroxyethyl methacrylate, β-hydroxypropyl acrylate, β-hydroxypropyl methacrylate, β-hydroxyvinyl ether, 5-hydroxypentyl vinyl ether, 6-hydroxyhexyl vinyl ether, polyethylene glycol monoacrylate, polyethylene glycol monomethacrylate, polypropylene glycol monoacrylate, and polypropylene glycol monomethacrylate.

Examples of the vinyl monomer having an epoxy group include glycidyl acrylate and glycidyl methacrylate.

The aqueous acrylic resin may contain, besides the alkyl (meth)acrylate and the above-mentioned vinyl monomer having a specific functional group, for example, acrylonitrile, styrenes, butyl vinyl ether, maleic acid mono- or di-alkyl ester, fumaric acid mono- or di-alkyl ester, itaconic acid mono- or di-alkyl ester, methyl vinyl ketone, vinyl chloride, vinylidene chloride, vinyl acetate, vinylpyridine, vinylpyrrolidone, and vinyltrimethoxysilane in combination.

The acrylic resin preferably has a carboxyl group (carboxylic acid group) and the acid value thereof is preferably not more than 40 mgKOH/g. Thereby, the above-mentioned oxazoline group and carboxyl group are reacted with each other and the coating layer can maintain the flexibility while being partially crosslinked, and therefore can satisfy both of improvement in cohesive force and stress relaxation of the inorganic thin film layer better. The acid value is more preferably not more than 20 mgKOH/g and even more preferably not more than 10 mgKOH/g. If the acid value exceeds 40 mgKOH/g, the crosslinking is promoted further, so that the flexibility of the coating layer may possibly be lowered and the stress on the inorganic thin film layer may possibly be increased at the time of a retort treatment. The lower limit of the acid value of the acrylic resin is not particularly limited, but it is preferably not less than 1 mgKOH/g.

The content of the acrylic resin in the resin composition for coating layers composing the coating layer is preferably 10 to 60% by mass, more preferably 15 to 55% by mass, and even more preferably 20 to 50% by mass based on 100% by mass of all of the resin ingredients (the total of the oxazoline group-containing resin, the acrylic resin and the below-mentioned urethane resin contained if necessary) in the composition. If the content of the acrylic acid is less than 10% by mass, the effects of water resistance and solvent resistance are not exerted efficiently in some cases, and on the other hand, if it exceeds 60% by mass, the coating layer is so hard as to make the stress load on the inorganic thin film layer increase at the time of a retort treatment.

The acrylic resin is preferably used in such a manner that the amount of the carboxyl group (amount of carboxylic acid group) [mmol] to the amount of the oxazoline group [mmol] in the resin composition for coating layers can be 0 to 20 mmol % and more preferably 0 to 15 mmol %. If the amount of the carboxyl group exceeds 20 mmol %, crosslinking reaction is promoted so further at the time of coating layer formation that a large amount of the oxazoline group may be consumed and the adhesion properties to the inorganic thin film layer and the flexibility of the coating layer are lowered, and as a result, the gas-barrier properties and the adhesion properties after a retort treatment may possibly be insufficient.

(Urethane Resin)

In the present invention, the resin composition for coating layers preferably contains a urethane resin.

As a urethane resin, for example, an aqueous resin such as a water-soluble or water-dispersible resin produced by reaction of a polyhydroxy compound and a polyisocyanate compound by a conventional method can be used. Particularly, an aqueous urethane resin having a carboxyl group or a salt thereof has high affinity with a water medium. Additionally, constituent ingredients of a urethane resin can be identified by nuclear magnetic resonance spectrometry or the like.

Examples of the polyhydroxy compound, a constituent ingredient of a urethane resin, include polyethylene glycol, polypropylene glycol, polyethylene•propylene glycol, polytetramethylene glycol, hexamethylene glycol, tetramethylene glycol, 1,5-pentanediol, diethylene glycol, triethylene glycol, neopentyl glycol, polycaprolactone, polyhexamethylene adipate, polyhexamethylene sebacate, polytetramethylene adipate, polytetramethylene sebacate, trimethylolpropane, trimethylolethane, pentaerythritol, and glycerin.

Examples of the polyisocyanate compound, a constituent ingredient of a urethane resin, include aromatic diisocyanates such as isomers of toluoylene diisocyanate, and 4,4-diphenylmethane diisocyanate; aromatic aliphatic diisocyanates such as xylylene diisocyanate; alicyclic diisocyanates such as isophorone diisocyanate, 4,4-dicyclohexylmethane diisocyanate, and 1,3-bis(isocyanatomethyl)cyclohexane; aliphatic diisocyanates such as hexamethylene diisocyanate and 2,2,4-trimethylhexamethylene diisocyanate; and also polyisocyanates obtained by previously carrying out an addition reaction of one or a plurality of these compounds with trimethylolpropane or the like.

The urethane resin preferably has a carboxyl group (carboxylic acid group) and the acid value thereof is preferably in a range from 10 to 40 mgKOH/g. Thereby, the carboxyl group in the urethane resin and the above-mentioned oxazoline group are reacted with each other and the coating layer can maintain the flexibility while being partially cross-linked, and therefore can satisfy both of improvement in cohesive force and stress relaxation of the inorganic thin film layer better. It is more preferably in a range from 15 to 35 mgKOH/g and further more preferably in a range from 20 to 30 mgKOH/g.

A carboxyl group may be introduced into a urethane resin by, for example, using a carboxyl group-containing polyol compound such as dimethylolpropionic acid and dimethylolbutanoic acid as a polyol ingredient (polyhydroxy compound), a copolymerizable ingredient, and carrying out neutralization with a salt forming agent. Specific examples of the salt forming agent may be ammonia, trialkylamines such as trimethylamine, triethylamine, triisopropylamine, tri-n-propylamine, and tri-n-butylamine; N-alkylmorpholines such as N-methylmorpholine and N-ethylmorpholine; N-dialkylalkanolamines such as N-dimethylethanolamine and N-diethylethanol amine. These compounds may be used alone, or 2 or more of them may be used in combination.

The content of the urethane resin in the resin composition for coating layers composing the coating layer is preferably 10 to 60% by mass, more preferably 15 to 55% by mass, and even more preferably 20 to 50% by mass based on 100% by mass of all of the resin ingredients (the total of the oxazoline group-containing resin, the acrylic resin and the urethane resin) in the composition. By adding the urethane resin in the above-mentioned range, improvement in water resistance can be expected.

The urethane resin is preferably used in such a manner that the amount of the carboxyl group (amount of carboxylic acid group) [mmol] to the amount of the oxazoline group [mmol] in the resin composition for coating layers can be 0 to 20 mmol % and more preferably 0 to 15 mmol %. If the amount of the carboxyl group exceeds 20 mmol %, cross-linking reaction is promoted so further at the time of coating layer formation that a large amount of the oxazoline group may be consumed and the adhesion properties to the inorganic thin film layer and the flexibility of the coating layer are lowered, and as a result, the gas-barrier properties and the adhesion properties after a retort treatment may possibly be insufficient.

The resin composition for coating layers may contain, if necessary, known inorganic and organic various additives such as an antistatic agent, a lubricant, and an anti-blocking agent to an extent that the present invention may not be impaired.

A method for forming the coating layer is not particularly limited and a conventionally known method such as a coating method or the like can be employed. Examples of a preferable method among coating methods may include an off-line coating method and an in-line coating method. In the case of the in-line coating method carried out, for example, in a step for producing a substrate film, although depending on the thickness of a coating and apparatus conditions, it is preferable as the condition for drying and heat treatment at the time of coating that, immediately after coating, a coating is subjected to a step of stretching in a vertical direction and dried in a preheating zone or a stretching zone in the stretching step, and in such as case, it is usually preferable to adjust the temperature to be about 50 to 250° C.

[Inorganic Thin Film Layer]

It is preferable for the multilayer film of the present invention that an inorganic thin film layer is formed on the coating layer. The inorganic thin film layer is a thin film of a metal or an inorganic oxide. A material for forming the inorganic thin film layer is not particularly limited as long as it can be formed into a thin film, and in terms of gas-barrier properties, preferable examples include inorganic oxides such as silicon oxide (silica), aluminum oxide (alumina), and a mixture (composite oxide) of silicon oxide and aluminum oxide. Particularly, from the viewpoint that both of flexibility and density of the thin layer can simultaneously be satisfied, the composite oxide of silicon oxide and aluminum oxide is preferable. In the composite oxide, the mixing ratio of silicon oxide and aluminum oxide preferably satisfy the mass ratio of Al on the basis of metal ingredient mass within a range from 20 to 70%. If the Al concentration is less than 20%, the barrier properties tend to be lowered, and on the other hand, if it exceeds 70%, the inorganic thin film layer tends to be hard and the film may possibly be broken at the time of a secondary process such as printing and lamination to result in lowering of the barrier properties. Herein, silicon oxide means various silicon oxides such as SiO and $SiO_2$, or a mixture thereof, and aluminum oxide means various aluminum oxides such as AlO and $Al_2O_3$, or a mixture thereof.

The thickness of the inorganic thin film layer is usually 1 to 800 nm and preferably 5 to 500 nm. If the thickness of the inorganic thin film layer is less than 1 nm, it sometimes becomes difficult to obtain satisfactory gas-barrier properties, and on the other hand, even if the thickness is made too thick beyond 800 nm, an improvement effect of gas barrier properties, corresponding to the thicker thickness, cannot be obtained and it is rather disadvantageous from the viewpoints of bending resistance and production cost.

The method for forming the inorganic thin film layer is not particularly limited, and known vapor deposition methods, e.g., physical vapor deposition methods (PVD methods) such as a vacuum vapor deposition method, a sputtering method, and an ion plating method, or chemical vapor deposition methods (CVD methods) may be employed appropriately. Hereinafter, a typical method for forming the inorganic thin film layer will be described by taking an example using a silicon oxide-aluminum oxide-based thin film as an example. For example, where a vacuum vapor deposition method is employed, a mixture of $SiO_2$ and $Al_2O_3$ or a mixture of $SiO_2$ and Al is used preferably as a raw material for vapor deposition. Although particles are usually used as such raw materials for vapor deposition, each particle is preferably in such a size that the pressure in vapor deposition does not change and a preferred particle diameter is 1 mm to 5 mm. For heating, such systems as resistance heating, high-frequency induction heating, electron beam heating, and laser heating can be employed. Reactive vapor deposition can also be employed in which oxygen, nitrogen, hydrogen, argon, carbon dioxide gas, water vapor, or the like is introduced as a reaction gas or such means as ozone addition or ion assistance is used. Moreover, it is also permitted to optionally change film formation conditions, for example, to add a bias to the deposition target (a multilayer film applied to deposition), or to heat or cool the deposition target. Likewise, such vapor deposition material, reaction gas, bias of the deposition target, eating/cooling, and so on may be changed also when employing a sputtering method or a CVD method.

Protection Layer

It is preferable for the multilayer film of the present invention to have a protection layer forming from a resin composition A for protection layers or a resin composition B for protection layers described in detail below on the inorganic thin film layer.

The inorganic thin film layer is not a completely dense film and very fine defective points dispersedly exit thereon. By applying the above-mentioned specific resin composition for protection layers to the inorganic thin film layer to form a protection layer, the resin in the resin composition for protection layers penetrates the detective points in the inorganic thin film layer and as a result, an effect for stabilizing gas-barrier properties can be obtained. In addition, coating the inorganic thin film layer with the protection layer can not only protect the inorganic thin film layer from scratching or smear in a printing process but also protect the inorganic thin film layer from a pigment contained in an ink to stably maintain barrier properties.

Hereinafter, the resin composition A for protection layers and the resin composition B for protection layers will be described.

(Resin Composition a for Protection Layers)

The resin composition A for protection layers comprises a polymer (a) of either a (meth)acrylic acid homopolymer or a (meth)acrylic acid/(meth)acrylic acid ester copolymer containing not less than 10% by mass of (meth)acrylic acid; a polyurethane-urea resin (b) having an ether bond; and at least one crosslinking agent (c) selected from epoxy resins, polyisocyanates, and silane coupling agents.

Since the resin composition A for protection layers comprises a polymer (a) of either a (meth)acrylic acid homopolymer or a (meth)acrylic acid/(meth)acrylic acid ester copolymer containing not less than 10% by mass of (meth)acrylic acid (hereinafter, sometimes referred to as "(meth)acrylic acid-based resin"), the solvent resistance of the protection layer can be improved, the leveling hindrance after transfer of a printing ink can be lessened, and a printed article excellent in the quality such as designing properties can be obtained. Since the polymer (a) has water resistance, deterioration of the resin itself hardly occurs even after a retort treatment is carried out. Further, the carboxyl group (carboxylic acid group) exists in the polymer (a) and the existence brings the following advantages, that is, the interaction with the inorganic thin film layer, a hydrophilic film, is firm, and at the same time, the carboxyl group reacts with the oxazoline group in the coating layer through the defective parts of the inorganic thin film layer and such firm adhesion properties between layers as to be durable for a retort treatment can be provided.

In the case where the (meth)acrylic acid-based resin (a) is a (meth)acrylic acid/(meth)acrylic acid ester copolymer, if the copolymerization ratio of (meth)acrylic acid ester is high, it becomes difficult to obtain sufficiently high solvent resistance and therefore, it is important that the copolymerization ratio of (meth)acrylic acid is not less than 10% by mass. It is preferably not less than 20% by mass and more preferably not less than 30% by mass. As the (meth)acrylic acid ester, (meth)acrylic acid alkyl esters are preferable, and as the alkyl group, a straight, branched, or cyclic alkyl group of not more than 50 carbon atoms (preferably not more than 30 carbon atoms, and more preferably not more than 20) is preferable and examples include a methyl group, an ethyl group, a butyl group, a 2-ethylhexyl group, and a lauryl group.

The weight average molecular weight of the above-mentioned (meth)acrylic acid-based resin (a) is preferably in a range from 10000 to 60000.

The resin composition A for protection layers is needed to comprise a polyurethane-urea resin (b) having an ether bond. In the case of only the (meth)acrylic acid-based resin (a), the protection layer tends to be hard and brittle and cannot relax scratching and smear stress in a printing process and may possibly be cracked together with the inorganic thin film layer; however, if the polyurethane-urea resin (b) is contained, effects to keep well balance between water resistance and flexibility of the coating layer and to lower the physical damages on the inorganic thin film layer in a printing process can be obtained.

The polyurethane-urea resin (b) has an ether bond in it structure. The ether bond can be introduced by using a polyol having an ether bond as a raw material of the polyurethane-urea resin. However, it is not necessarily needed that all polyols to be used as raw materials for the polyurethane-urea resin have an ether bond but some of polyols have an ether bond. Additionally, those which have an ether bond and a carbonate bond may be used.

The polyol having an ether bond (hereinafter, sometimes referred to as "ether-based polyol") are not particularly limited and examples of the polyol that can be used include conventionally known polyether polyols, e.g., alkylene glycol such as polyethylene glycol, polypropylene glycol, and polytetramethylene glycol.

In the case where another polyol is used in combination with the ether-based polyol, the use ratio of both may appropriately be set. In the case where the compatibility with the (meth)acrylic acid-based resin (a) is considered to be important, the ratio of the ether-based polyol is increased, and in the case where the solvent resistance is considered to be important, the ratio of another polyol is increased and thus the capabilities of the protection layer can be controlled as desired. Specifically, for example, the ratio of the polyol having an ether bond is preferably 20 to 100% by mass in all polyols. The ether-based polyol and another polyol may be mixed at the time of synthesizing a polyurethane resin, or the respective polyols may be used for synthesizing respective polyurethane-urea resins and the obtained respective polyurethane-urea resins may be mixed.

The molecular weight of the polyurethane-urea resin (b) is not particularly limited and usually, it is preferable that the weight average molecular weight is within a range from 10000 to 50000.

In the resin composition A for protection layers, the content ratio of the (meth)acrylic acid-based resin (a) and the polyurethane-urea resin (b) may be set appropriately in accordance with the properties of a desired inorganic thin film layer, and for example, the mass ratio (a):(b) is preferably in a range of 5:95 to 95:5 and (a):(b) is more preferably in a range of 10:90 to 90:10.

The resin composition A for protection layers further comprises at least one crosslinking agent (c) selected from epoxy resins, polyisocyanates, and silane coupling agents. Accordingly, the solvent resistance and water resistance of the protection layer are further improved. In detail, if a bi- or higher functional epoxy resin or polyisocyanate is contained as a crosslinking agent (curing agent), a protection layer with high physical properties can be obtained, and if a silane coupling agent is contained as a crosslinking agent, the water resistance can be increased further.

Examples of the above-mentioned epoxy resin that can be used as the crosslinking agent (c) are not particularly limited and conventionally known ones can be used, and in particular, epoxy resins having 2 or more epoxy groups are preferable.

Examples of the above-mentioned polyisocyanate that can be used as the crosslinking agent (c) are not particularly limited and conventionally known ones can be used, and preferable examples thereof in particular include polyisocyanates or block polyisocyanates having 2 or more isocyanate groups.

The content of the epoxy resin or polyisocyanate is not particularly limited and usually, each content is preferably about 5 to 20% by mass and more preferably 8 to 15% by mass based on the total 100% by mass of the coating formation ingredients ((meth)acrylic acid-based resin (a), polyurethane-urea resin (b) and crosslinking agent (c)).

A silane coupling agent that can be used as the crosslinking agent (c) is not particularly limited and any silane coupling agent can be used as long as it has a hydrolyzable alkoxysilyl group, for example, β-(3,4-epoxycyclohexyl) ethyltrimethoxysilane, γ-glycidoxymethoxysilane, γ-mercaptopropyltrimethoxysilane, N-β-(aminoethyl) γ-aminopropyltrimethoxysilane, N-β-(aminoethyl) γ-aminopropylmethyldimethoxysilane, γ-aminopropyltriethoxysilane, and N-phenyl-γ-aminopropyltrimethoxysilane.

The content of the silane coupling agent is not particularly limited and usually, it is preferably about 5 to 20% by mass and more preferably 8 to 15% by mass based on the total 100% by mass of the coating formation ingredients ((meth) acrylic acid-based resin (a), polyurethane-urea resin (b) and crosslinking agent (c)).

In the case where a protection layer is formed using the resin composition A for protection layers, a coating liquid (application liquid) obtained by dissolving the resin composition A for protection layers may be applied and dried. A method for preparing the coating liquid is not particularly limited and for example, the (meth)acrylic acid-based resin (a) and the polyurethane-urea resin (b) may be dissolved together in a common solvent or may be dissolved in different solvents having mutual solubility and thereafter the obtained solutions may be mixed.

Preferable examples of a solvent in which the (meth) acrylic acid-based resin (a) is soluble include alcohol-based solvents such as methanol, ethanol, isopropyl alcohol, and propylene glycol monomethyl ether, and preferable examples of a solvent in which the polyurethane-urea resin (b) having an ether bond is soluble include ester-based solvents such as ethyl acetate and n-propyl acetate, ketone-based solvents such as methyl ethyl ketone, as well as mixed solvents of these solvents and the alcohol-based solvents. The use amount of the solvent is not particularly limited and usually, it is preferable to use the solvent in such a manner that the solid matter in the coating liquid is about 5 to 15% by mass.

The coating liquid for forming the protection layer may contain proper additives such as silicon dioxide, fatty acid amide, and polyethylene wax to prevent blocking and improve slipping properties, if necessary.

(Resin Composition B for Protection Layers)

The resin composition B for protection layers comprises a polyester resin (d) having a weight average molecular weight of 22,000 to 40,000 and a polyisocyanate (e).

Since the resin composition B for protection layers comprises a polyester resin (d) and a polyisocyanate (e), a crosslinked structure by the polyisocyanate may be formed and water resistance is excellent and deterioration of the resin itself can be suppressed even if a retort treatment is carried out. Moreover, since the weight average molecular weight of the polyester resin (d) is within the above mentioned range, the protection layer is provided with water resistance by crosslinking and with flexibility even in the portions which are not crosslinked, and thus contributes to relaxation of stress on the inorganic thin film layer and suppression of deterioration in a retort treatment.

The polyester resin (d) is obtained by using, as a polycarboxylic acid ingredient, terephthalic acid, isophthalic acid, adipic acid, sebacic acid, azelaic acid, orthophthalic acid, diphenyldicarboxylic acid, dimethylphthalic acid, and the like, and as a polyalcohol ingredient, ethylene glycol, 1,2-propylene glycol, 1,3-propylene glycol, 1,4-butanediol, diethylene glycol, neopentyl glycol, dipropylene glycol, 1,6-hexanediol, bisphenol A, and the like, and carrying out reaction of these polycarboxylic acid ingredient and polyalcohol ingredient at such an equivalent ratio of a COOH group and an OH group as to be excess of an OH group.

The polyester resin (d) is needed to have a weight average molecular weight of 22,000 to 40,000, preferably 23,000 to 39,000, and more preferably 24,000 to 38,000. If the weight average molecular weight of the polyester resin (d) is smaller than 22,000, the protection layer tends to be hard and brittle and it becomes difficult for the protection layer to have sufficient performances, and on the other hand, if it exceeds 40,000, the crosslinking is insufficient even if crosslinking is carried out with the polyisocyanate (e) and it becomes difficult to obtain sufficient durability against an organic solvent in a gravure ink. The weight average molecular weight of the polyester resin (d) can be controlled within the above-mentioned range by adjusting the equivalents and use amounts of the polycarboxylic acid ingredient and polyalcohol ingredient to be used.

The polyester resin (d) preferably has a hydroxyl value of not more than 60 mgKOH/g, more preferably not more than 50 mgKOH/g, and even more preferably not more than 40 mgKOH/g. If the hydroxyl value of the polyester resin (d)

exceeds 60 mgKOH/g, the protection layer coating to be formed tends to be a hard and unexpandable film owing to an excessively crosslinked structure. The hydroxyl value of the polyester resin (d) can be controlled within the above-mentioned range by adjusting the equivalents of the polycarboxylic acid ingredient and polyalcohol ingredient to be used.

The polyisocyanate (e) is not particularly limited and polyisocyanates known as a crosslinking agent may be used. Particularly, those having 3 or more active isocyanate groups in one molecule are preferable and polyisocyanates containing not less than 12% by mass (based on conversion into solid matter) of isocyanate group are preferable. As such polyisocyanates, "Coronate (registered trademark) L" manufactured by Nippon Polyurethane Industry Co., Ltd. and the like are commercialized.

In the case where the protection layer is formed using the resin composition B for protection layers, a coating liquid (application liquid) obtained by dissolving the polyester resin (d) in an organic solvent is prepared, the polyisocyanate (e) is added to the coating liquid immediately before application, and then the coating layer is applied and dried. As an organic solvent in which the polyester resin (d) is dissolved, one or mixed solvent selected from esters such as ethyl acetate and butyl acetate, ketones such as methyl ethyl ketone and methyl isobutyl ketone, and aromatic hydrocarbons such as toluene and xylene can be used, and in terms of coating processing and odor, a mixed solvent of toluene and methyl ethyl ketone is preferable.

The use amount of the polyisocyanate (e) is preferably 1 to 20 parts by mass and more preferably 3 to 15 parts by mass to 100 parts by mass of the polyester resin (d). If the use amount of the polyisocyanate (e) exceeds 20 parts by mass, the isocyanate group is excess and the protection layer to be formed tends to be hard and deteriorated in the flexibility, and on the other hand, if it is less than 1 part by mass, the isocyanate group is in deficient and it becomes impossible to obtain a protection layer having a sufficiently crosslinked structure and the solvent resistance against a solvent of a gravure ink may possibly be insufficient.

The coating liquid for forming the protection layer can contain various additives if necessary. For example, addition of a silane coupling agent to the coating liquid can improve the adhesion properties to the inorganic thin film layer to which the coating liquid is to be applied and also water resistance. The coating liquid for forming the protection layer may also contain additives such as silicon dioxide, fatty acid amide, and polyethylene wax to prevent blocking and improve slipping properties of the protection layer.

A method for coating the resin composition for protection layers is not particularly limited as long as it is a method for forming a layer by coating the film surface. Examples of the coating method that can be employed include usual coating methods such as gravure coating, reverse roll coating, wire bar coating, and die coating.

The application amount of the resin composition for protection layers at the time of application is not particularly limited and it is preferably within a range from 0.01 to 5 g/m$^2$ in dry state, and in terms of practical application, it is more preferably within a range from 0.05 to 1 g/m$^2$. If it is less than 0.01 g/m$^2$, it becomes difficult to obtain sufficient adhesion properties and film formability, and if it exceeds 5 g/m$^2$, it tends to be disadvantageous in terms of the cost.

At the time of forming the protection layer, it is preferable to apply the resin composition for protection layers and heat and dry the resin composition for protection layers and at that time, the drying temperature is preferably 100 to 200° C., more preferably 110 to 200° C., and even more preferably 120 to 200° C. If the drying temperature is less than 100° C., the protection layer may be dried insufficiently or crosslinking of the protection layer cannot be promoted, and thus the water resistance of the protection layer may possibly be lowered in the case where a retort treatment is carried out. On the other hand, if the drying temperature exceeds 200° C., the film is too much heated and the film may possibly be brittle and be shrunk, and the processibility may be worsened. Separately from the drying, it is also effective to add an additional heat treatment (e.g., 150 to 200° C.) on promotion of the crosslinking of the protection layer.

[Other Layers]

On the multilayer film of the present invention, various layers which conventional gas-barrier multilayer films have may be formed if necessary, besides the above-mentioned substrate film, coating layer, inorganic thin film layer and protection layer.

For example, in the case where the gas-barrier multilayer film having an inorganic thin film layer is used as a packaging material, it is preferable to form a heat sealing resin layer, so-called sealant. The heat sealing resin layer is usually formed on the protection layer and it is sometimes formed on the outside (the face reverse to the coating layer formed face) of the substrate film. The heat sealing resin layer may be formed usually by an extrusion lamination method or a dry lamination method. A thermoplastic polymer forming the heat sealing resin layer may be one which can sufficiently exhibit sealant adhesive properties and examples usable are polyethylene resins such as HDPE, LDPE, and LLDPE, polypropylene resins, ethylene-vinyl acetate copolymers, ethylene-α-olefin random copolymers, and ionomer resins.

In the multilayer film of the present invention, at least one or more layers of a printing layer, another plastic substrate, and/or a paper substrate may be layered between the heat sealing resin layer and either the protection layer or the substrate film or on the outside.

A printing ink for forming the printing layer, aqueous and solvent-based resin-containing printing inks can be preferably used. Examples of the resin to be used in the printing ink include acrylic resins, urethane-based resins, polyester-based resins, vinyl chloride-based resins, vinyl acetate copolymer resins, and mixtures thereof. The printing ink may contain known additives such as an antistatic agent, a light ray shutting agent, a UV absorbent, a plasticizer, a lubricant, a filler, a colorant, a stabilizer, a lubricating agent, a defoaming agent, a crosslinking agent, an anti-blocking agent, and an antioxidant. A printing method for forming a printing layer is not particularly limited and known printing methods such as an off-set printing method, a gravure printing method, and a screen printing method can be employed. To dry the solvent after printing, known drying methods such as hot air drying, hot roll drying, and infrared drying can be employed.

On the other hand, as another plastic substrate and the paper substrate, paper, polyester resins, polyamide resins, biodegradable resins, and the like are preferably used from the viewpoint of obtaining sufficient rigidity and strength of multilayer bodies. In the case of obtaining a film excellent in mechanical strength, a stretched film such as a biaxially stretched polyester film and a biaxially stretched nylon film is preferable.

Particularly, in the case where the multilayer film of the present invention is used as a packaging material, a nylon film is preferably laminated between the protection layer and the heat sealing resin layer in order to improve the mechanical properties such as pinhole properties and piercing strength. The types of nylon to be employed are usually nylon 6, nylon 66, metaxylene adipamide, and the like. The thickness of the nylon film is usually 10 to 30 μm and preferably 15 to 25 μm. If the nylon film is thinner than 10 μm, the strength may possibly be insufficient, and on the other hand if it exceeds 30 μm, the stiffness is too high and it is sometimes suitable for processibility. The nylon film is preferably a biaxially stretched film having a stretching magnification of usually 2 times or more and preferably about 2.5 to 4 times in the vertical and transverse directions, respectively.

The multilayer film of the present invention as described above can be a gas-barrier multilayer film excellent in gas-barrier properties and in lamination strength with high interlayer adhesion properties after a retort treatment, and satisfying both of the gas-barrier properties and printing properties such as designing properties without damaging the inorganic thin film layer even if a printing process is carried out.

EXAMPLES

Next, the present invention will be described in detail with reference to Examples and Comparative Examples; however, the present invention is not limited to the following Examples. Hereinafter, "%" means "% by mass" and "part(s)" means "part(s) by mass" unless otherwise noted.

The physical property measurement methods employed in Examples and Comparative Examples are as follows.

<Method for Measuring Total Reflection Infrared Absorption Spectrum of Coating Layer>

In respective Examples and Comparative Examples, the total reflection infrared absorption spectrum was measured by total reflection infrared absorption spectrometry for the coating layer of each of obtained films in the stage that the coating layer was formed on a substrate film, and the peak-intensity (P1) of the peak (peak derived from oxazoline) having the absorption maximum in a region of $1655\pm10$ cm$^{-1}$ and the peak-intensity (P2) of the peak (peak derived from polyethylene terephthalate) having the absorption maximum in a region of $1580\pm10$ cm$^{-1}$ were measured and the intensity ratio (P1/P2) was calculated.

Upon calculation of the peak-intensity, the peak-intensity ratio (P1/P2) was calculated based on the ratio of the heights of the respective peaks. In addition, regarding the peak having the absorption maximum in a region of $1655\pm10$ cm$^{-1}$, since the peak corresponded to a shoulder, the line connecting 1600 cm$^{-1}$ and 1800 cm$^{-1}$ was employed as a base line, and regarding the peak having the absorption maximum in a region of $1580\pm10$ cm$^{-1}$, the base line was employed as a line connecting sleeves in both sides of the peak.

(Measurement Condition)
Apparatus: FTS-60A/896 manufactured by Varian
One time reflection ATR attachment: Silver Gate manufactured by
SPECTRA TECH
Optical crystal: Ge
Incident angle: 45°
Resolution: 4 cm$^{-1}$
Cumulative number: 128 times In the case where the thickness of the coating layer was too thin to obtain sufficient sensitivity (Examples 1-6, 2-6 and 3-6, and Comparative Examples 1-4, 2-4 and 3-4), the one time reflection attachment to be used was changed to an attachment having a larger incident angle (65 degrees) (Vee Max, manufactured by ST Japan Inc.) for the measurement.

<Method for Measuring Thickness (D) of Coating Layer>

In the respective Examples and Comparative Examples, a multilayer film obtained in a stage of laminating only the coating layer on a substrate film was used as a specimen, the specimen was diagonally cut and the obtained diagonally cut face was observed, and height measurement from the coating layer surface to the interface of the coating layer/substrate film was performed by a scanning probe microscope (SPM) to thereby measure the thickness (D) (nm) of the coating layer.

The diagonal cutting of the specimen was performed by using SAICAS NN04, manufactured by Daipla Wintes Co., Ltd., and a diamond knife as a cutting blade in conditions of a horizontal speed of about 500 nm/s and a vertical speed of about 20 nm/s.

The diagonally cut face was observed by using a scanning probe microscope (SPM) (SPA 300 (Nanonavi Probe Station) manufactured by SII Nano-technology) and a cantilever (DF 3 or DF20, manufactured by the same company with observation mode: DFM mode. In detail, observation was carried out in such a manner that the coating layer surface and the diagonally cut face were within one visual field and the coating layer surface was subjected to a leveling treatment to correct the inclination of the observation image. The leveling treatment was carried out by manual inclination correction which was one of function of the software attached to SPM, to correct the inclinations in X direction and Y direction. The coating layer/substrate film interface was determined in an image which was obtained by processing the entire observation visual field by the leveling treatment (secondary inclination correction, one function of the software). Since the physical properties of the coating layer were different from those of the substrate film, the coating layer/substrate film interface was easily recognized according to that the cutting angle was changed in the interface; that the contrast of the coating layer and the substrate film was changed in the phase image by SPM; and that the uneven state of the cutting face was changed between the coating layer and the substrate film.

Using the data of infrared absorbance ratio (P1/P2) and thickness (D) of the coating layer obtained in the above-mentioned measurement, the (P1/P2)/D value of each of multilayer films obtained in the respective Examples and Comparative Examples was calculated.

<Amount of Oxazoline Group of Oxazoline Group-Containing Resin>

An oxazoline group-containing resin was freeze-dried and the $^1$H-NMR of the resulting resin was measured by nuclear magnetic resonance spectrometer (NMR) (Gemini 200, manufactured by Varian) to measure the absorption peak intensity derived from an oxazoline group and the absorption peak intensities derived from other monomers, and the amount of the oxazoline group (mmol/g) was calculated from these peak intensities.

The respective materials used for forming each of the coating layers in the respective Examples and Comparative Examples were prepared as follows.

(Oxazoline Group-Containing Resin (A—1))

A flask equipped with a stirrer, a refluxing condenser, a nitrogen introduction pipe and a thermometer was loaded with 460.6 parts of isopropyl alcohol and heated to 80° C. while nitrogen gas being moderately introduced. Further, a previously prepared monomer mixture containing 126 parts of methyl methacrylate, 210 parts of 2-isopropenyl-2-oxazoline and 84 parts of methoxypolyethylene glycol acrylate, and an initiator solution containing 21 parts of 2,2'-azobis(2-methylbutyronitrile) (ABN-E, manufactured by Japan Hydrazine Company) as a polymerization initiator and 189 parts of isopropyl alcohol were each dropwise added thereto for 2 hours through a titration funnel and reacted, and after completion of the dropwise addition, the reaction was continued successively for 5 hours. During the reaction, nitrogen gas was continuously introduced and the temperature in the flask was kept at 80±1° C. Thereafter, the reaction liquid was cooled and the obtained polymer was dissolved in ion-exchanged water to obtain an oxazoline group-containing resin (A-1) having a solid matter concentration of 25%. The amount of the oxazoline group of the obtained oxazoline group-containing resin (A-1) was 4.3 mmol/g and the number average molecular weight thereof measured by GPC (gel permeation chromatography) was 20000.

(Oxazoline Group-Containing Resin (A-2))

An oxazoline group-containing resin (A-2) having a solid matter concentration of 10% and different composition (amount of oxazoline group and molecular weight) was obtained in the same manner as that for synthesizing the oxazoline group-containing resin (A-1). The amount of the oxazoline group of the obtained oxazoline group-containing resin (A-2) was 7.7 mmol/g and the number average molecular weight thereof measured by GPC was 40000.

(Acrylic Resin (B-1))

As an acrylic resin, a 25% by mass emulsion of a commercially available acrylic acid ester copolymer (Mowinyl (registered trademark) 7980, manufactured by Nichigo-Mowinyl Co., Ltd.) was prepared. The acid value (theoretical value) of this acrylic resin (B-1) was 4 mgKOH/g.

(Urethane resin (C-1))

A four-neck flask equipped with a stirrer, a Dimroth condenser, a nitrogen introduction pipe, a silica gel drying pipe and a thermometer was loaded with 72.96 parts of 1,3-bis(isocyanatomethyl)cyclohexane, 12.60 parts of dimethylolpropionic acid, 11.74 parts of neopentyl glycol, 112.70 parts of polyester diol having a number average molecular weight of 2000, and as solvents, 85.00 parts of acetonitrile and 5.00 parts of N-methylpyrrolidone, and under nitrogen atmosphere, the resultant was stirred at 75° C. for 3 hours and it was confirmed that the reaction liquid reached a specific amine equivalent. Next, the reaction liquid was cooled to 40° C. and thereafter, 9.03 parts of triethylamine was added to obtain a polyurethane prepolymer solution (isocyanate group-terminated prepolymer).

Next, a reaction container equipped with a homodisper capable of stirring at high speed was loaded with 450 parts of water and adjusted to be at 25° C., and while stirring and mixing at 2000 min$^{-1}$, the entire amount of the obtained polyurethane prepolymer solution (isocyanate group-terminated prepolymer) was added and dispersed in water. Thereafter, under reduced pressure, a portion of acetonitrile and water was removed to prepare a water-soluble polyurethane resin (C-1) having a solid matte concentration of 30%. The acid value (theoretical value) of the obtained water-soluble polyurethane resin (C-1) was 25 mgKOH/g.

Example 1-1

(1) Preparation of Coating Liquid (Resin Composition for Coating Layers)

The respective materials were mixed at the following blending ratio to produce a coating liquid (resin composition for coating layers). The mass ratio (based on conversion into solid matter) of the oxazoline group-containing resin, acrylic resin, and urethane resin in the obtained coating liquid is as shown in Table 1.

| | |
|---|---|
| Water | 67.53% by mass |
| Isopropanol | 5.00% by mass |
| Oxazoline group-containing resin (A-2) | 20.00% by mass |
| Acrylic resin (B-1) | 4.80% by mass |
| Urethane resin (C-1) | 2.67% by mass |

(2) Production of Polyester Substrate Film and Formation of Coating Layer

After previously crystallized, a poly(ethylene terephthalate) (PET) having a limiting viscosity of 0.62 (30° C., phenol/tetrachloroethane (mass ratio)=60/40) was dried and extruded at 280° C. by using an extruder having a T die, and quenched and solidified on a drum having a surface temperature of 40° C. to obtain an amorphous sheet. Next, the obtained amorphous sheet was stretched at 100° C. to 4.0 times as long in the vertical direction between a heating roll and a cooling roll to obtain a uniaxially stretched PET film.

Next, one face of the obtained uniaxially stretched PET film was coated with the resin composition for coating layers (coating liquid) prepared in the above description (1) by a fountain bar coating method. Thereafter, the film was led to a tenter while being dried and the solvent was volatilized and dried at a preheating temperature of 100° C. Then, the film was stretched at 120° C. to 4.0 times as wide in the transverse direction and subjected to a thermal fixation treatment at 225° C. while a 6% relaxing treatment in the transverse direction being carried out to obtain a bilayer film (plastic substrate film/coating layer) composed of a biaxially stretched polyester film (plastic substrate film) having a thickness of 12 μm and a coating layer formed on one face of the polyester film.

This bilayer film was subjected to total reflection infrared absorption spectrometry and thickness measurement. The results are shown in Table 1.

(3) Formation of Inorganic Thin Film Layer (Vapor Deposition)

Next, on the coating layer face of the multilayer film obtained in the above description (2), as an inorganic thin film layer, a composite oxide layer of silicon dioxide and aluminum oxide was formed by an electron beam vapor deposition method. As a vapor deposition source, granular $SiO_2$ (purity 99.9%) and $Al_2O_3$ (purity 99.9%) in a size of about 3 mm to 5 mm were used. A thickness of the inorganic thin film layer ($SiO_2/Al_2O_3$ composite oxide layer) in the film (inorganic thin film layer/coating layer-containing film) obtained in such a manner was 13 nm. The composition of this composite oxide layer was $SiO_2/Al_2O_3$ (mass ratio)=60/40.

In the above-mentioned manner, a multilayer film of the present invention having a coating layer and an inorganic thin film layer on a substrate film was obtained. For the obtained multilayer film, the oxygen permeability, water vapor permeability and lamination strength were evaluated by the following methods. The results are shown in Table 1.

<Production of Laminate Multilayer Body a for Evaluation>

A nylon film having a thickness of 15 μm (N1100, manufactured by Toyobo Co., Ltd.) was stuck to the inorganic thin film layer of each of the multilayer films obtained in Examples 1-1 to 1-9 and Comparative Examples 1-1 to 1-4 by using a urethane-based two-component curable adhesive (obtained by blending "Takelac (registered trademark) A525S" with "Takenate (registered trademark) A50"(manufactured by Mitsui Chemicals Inc.) at 13.5:1 (mass ratio)) in a dry laminate method, then, an un-stretched polypropylene film having a thickness of 70 μm (P1147, manufactured by Toyobo Co., Ltd.) as a heat sealing resin layer was stuck on the above nylon film by using the same urethane-based two-component curable adhesive in the dry laminate method, and the resulting multilayer film was aged at 40° C. for 4 days to obtain a laminate gas-barrier multilayer body for evaluation (hereinafter, sometimes referred to as laminate multilayer body A). All of adhesive layers formed by using the urethane-based two-component curable adhesive had a thickness of about 4 μm after drying.

<Method for Evaluation of Water Vapor Permeability>

According to a JIS-K7129-B method, each laminate multilayer body A produced in the above-mentioned manner was subjected to water vapor permeability measurement in normal state under an atmosphere represented by a temperature of 40° C. and a humidity of 100% RH by using a water vapor permeability measurement apparatus (PERMATRAN-W 3/33MG, manufactured by MOCON). The water vapor permeability measurement was carried out in the direction of permeating each laminate multilayer body from the substrate film side to the heat sealing resin layer side with water vapor.

On the other hand, each laminate multilayer body A produced in the above-mentioned manner was subjected to a retort treatment by keeping the laminate multilayer body in pressurized hot water having a temperature of 131° C. for 30 minutes and then dried at 40° C. for 24 hours, and the obtained laminate multilayer body after the retort treatment was subjected to water vapor permeability measurement (after retort treatment) in the same manner as described above.

<Method for Evaluation of Oxygen Permeability>

According to an electrolytic sensor method in JIS-K7126-2 (appendix A), each laminate multilayer body A produced in the above-mentioned manner was subjected to oxygen permeability measurement in normal state under an atmosphere represented by a temperature of 23° C. and a humidity of 65% RH by using an oxygen permeability measurement apparatus (OX-TRAN 2/20, manufactured by MOCON). The oxygen permeability measurement was carried out in the direction of permeating each laminate multilayer body from the substrate film side to the heat sealing resin layer side with oxygen.

On the other hand, each laminate multilayer body A produced in the above-mentioned manner was subjected to a retort treatment by keeping the laminate multilayer body in pressurized hot water having a temperature of 131° C. for 30 minutes and dried at 40° C. for 24 hours and the obtained laminate multilayer body after the retort treatment was subjected to oxygen permeability measurement (after retort treatment) in the same manner as described above.

<Method for Evaluation of Lamination Strength>

Each laminate multilayer body A produced in the above-mentioned manner was cut into a size of 15 mm in width and 200 mm in length to obtain a test piece and the lamination strength (normal state) was measured in conditions of a temperature of 23° C. and a relative humidity of 65% by using a Tensilon universal material testing machine (Tensilon UMT-II-500 model, manufactured by Toyo Baldwin Corp.). Water was applied to between the inorganic thin film layer (gas-barrier multilayer film layer) of each of the laminate multilayer films obtained in Examples and Comparative Examples and the nylon film layer, and then the strength at the time of peeling the layers at a peeling angle of 90 degrees was measured with a tensile speed adjusted to 200 mm/minute.

On the other hand, each laminate multilayer body A produced in the above-mentioned manner was subjected to a retort treatment by keeping the laminate multilayer body in pressurized hot water having a temperature of 131° C. for 30 minutes and immediately after that, a test piece was cut out of the obtained laminate multilayer body in the same manner as described above and subjected to lamination strength measurement (after retort treatment) in the same manner as described above.

Examples 1-2 to 1-9 and Comparative Examples 1-1 to 1-4

Multilayer films were produced in the same manner as in Example 1, except that the use amounts of the respective materials were changed so as to give the mass ratios (on the basis of conversion into solid matter) of the oxazoline group-containing resin, acrylic resin and urethane resin as shown in Table 1 (at that time, the ratio of isopropanol in the entire amount of the coating liquid was adjusted to 5.00% by mass as the same as in Example 1-1) at the time of preparing the coating liquids (resin compositions for coating layers), or that the coating amounts of the coating liquids were changed so as to give the thickness of the coating layer as shown in Table 1, and oxygen permeability, water vapor permeability and lamination strength were evaluated. The results are shown in Table 1.

TABLE 1

| | Coating layer | | | | | |
|---|---|---|---|---|---|---|
| | Type of urethane resin | Type of acrylic resin | Type of oxazoline group-containing resin | Urethane resin/ acrylic resin/ oxazoline group-containing resin (mass ratio) | (P1/P2)/D (nm$^{-1}$) | Thickness (D) (nm) |
| Example 1-1 | (C-1) | (B-1) | (A-2) | 20/30/50 | 0.059 | 50 |
| Example 1-2 | — | (B-1) | (A-2) | 0/50/50 | 0.060 | 50 |
| Example 1-3 | — | (B-1) | (A-1) | 0/50/50 | 0.038 | 50 |
| Example 1-4 | (C-1) | (B-1) | (A-2) | 20/30/50 | 0.053 | 100 |
| Example 1-5 | (C-1) | (B-1) | (A-2) | 20/30/50 | 0.052 | 150 |
| Example 1-6 | (C-1) | (B-1) | (A-2) | 20/30/50 | 0.104 | 10 |
| Example 1-7 | (C-1) | (B-1) | (A-2) | 20/50/30 | 0.039 | 50 |
| Example 1-8 | (C-1) | (B-1) | (A-2) | 10/50/40 | 0.050 | 50 |
| Example 1-9 | (C-1) | (B-1) | (A-1) | 20/30/50 | 0.037 | 50 |

TABLE 1-continued

| | | | | | | |
|---|---|---|---|---|---|---|
| Comparative Example 1-1 | (C-1) | (B-1) | (A-2) | 20/50/30 | 0.031 | 200 |
| Comparative Example 1-2 | — | — | (A-2) | 0/0/100 | 0.110 | 50 |
| Comparative Example 1-3 | (C-1) | (B-1) | (A-2) | 40/50/10 | 0.018 | 50 |
| Comparative Example 1-4 | — | (B-1) | (A-2) | 0/10/90. | 0.201 | 5 |

| | Evaluation | | | | | |
|---|---|---|---|---|---|---|
| | Oxygen permeability (ml/m$^2$ · day · MPa) | | Water vapor permeability (g/m$^2$ · day) | | Lamination strength (N/15 mm) | |
| | Normal state | After retort treatment | Normal state | After retort treatment | Normal state | After retort treatment |
| Example 1-1 | 8 | 8 | 2.0 | 2.1 | 3.8 | 3.1 |
| Example 1-2 | 8 | 6 | 1.8 | 2.1 | 3.5 | 3.0 |
| Example 1-3 | 9 | 12 | 1.8 | 1.9 | 3.5 | 3.5 |
| Example 1-4 | 7 | 7 | 1.8 | 2.0 | 3.9 | 3.5 |
| Example 1-5 | 8 | 9 | 2.0 | 1.5 | 3.7 | 3.4 |
| Example 1-6 | 9 | 8 | 2.0 | 2.0 | 4.7 | 3.2 |
| Example 1-7 | 8 | 8 | 1.8 | 2.1 | 3.8 | 3.1 |
| Example 1-8 | 8 | 7 | 1.7 | 2.2 | 4.1 | 3.1 |
| Example 1-9 | 8 | 13 | 2.4 | 2.2 | 3.5 | 3.0 |
| Comparative Example 1-1 | 8 | 18 | 1.9 | 2.6 | 3.3 | 3.0 |
| Comparative Example 1-2 | 7 | 20 | 2.5 | 2.8 | 3.5 | 3.0 |
| Comparative Example 1-3 | 10 | 29 | 2.0 | 1.8 | 3.0 | 1.5 |
| Comparative Example 1-4 | 6 | 19 | 2.3 | 2.7 | 3.5 | 3.2 |

Example 2-1

(1) Preparation of Coating Liquid 1 (Resin Composition for Coating Layers)

A coating liquid (resin composition for coating layers) was produced in the same manner as in the description (1) of Example 1-1. The mass ratios (based on conversion into solid matter) of the oxazoline group-containing resin, acrylic resin and urethane resin in the obtained coating liquid were as shown in Table 2.

(2) Preparation of Coating Liquid 2 (Resin Composition for Protection Layers A)

First, 9 parts by mass of a polyester polyol (weight average molecular weight 2,000) obtained by polymerization of neopentyl glycol and adipic acid was mixed with 1 part by mass of polypropylene glycol (weight average molecular weight 2,000) and then the obtained mixture was reacted with isophorone diisocyanate at a mass ratio adjusted to NCO:OH (equivalent ratio)=3:2 to obtain an isocyanate-terminated prepolymer, and isophoronediamine in an amount of 1.1 times as much as the theoretic equivalent was added to the prepolymer to extend the molecular chains and thus a polyurethane-urea resin having an amino group at a terminal and an ether bond was prepared.

Next, poly(methacrylic acid) (weight average molecular weight 30,000) in an amount proper to adjust the solid matter concentration to 30% was dissolved in isopropyl alcohol and the above obtained polyurethane-urea resin in an amount proper to adjust the solid matter concentration to 30% was dissolved in a mixed solvent of ethyl acetate/methyl ethyl ketone/isopropyl alcohol (ethyl acetate:methyl ethyl ketone:isopropyl alcohol=2/2/1 (mass ratio)). The obtained each solution was mixed so that a mass ratio (on the basis of conversion into solid matter) of the respective resins in the each solution was poly(methacrylic acid)/polyurethane-urea resin=50/50, and further so that the solid matter concentration in a mixed solvent of ethyl acetate/isopropyl alcohol solvent (ethyl acetate:isopropyl alcohol=1:1 (mass ratio)) was 15%, thereby obtaining a poly(methacrylic acid)/polyurethane-urea resin-containing solution.

Next, the poly(methacrylic acid)/polyurethane-urea resin-containing solution obtained as described was mixed with, as a crosslinking agent, an epoxy-based curing agent (Epo Tohoto YP300, manufactured by Tohoto Kasei Co., Ltd, non-volatile component 100%) and a silane coupling agent (Shin-Etsu Silicon KBM 403, manufactured by Shin-Etsu Chemical Co., Ltd., non-volatile component 100%) in an amount of 10%, respectively, on the basis of the solid matter of the poly(methacrylic acid)/polyurethane-urea resin-containing solution to obtain a coating liquid 2 (resin composition for protection layers A).

(3) Production of Polyester Substrate Film and Formation of Coating Layer

A bilayer film (plastic substrate film/coating layer) having a biaxially stretched polyester film (plastic substrate film) having a thickness of 12 μm and a coating layer on one face of the polyester film was obtained in the same manner as in the description (2) of Example 1-1 by using the coating liquid 1 (resin composition for coating layers) prepared in the in the above description (1).

This bilayer film was subjected to total reflection infrared absorption spectrometry and thickness measurement. The results are shown in Table 2.

(4) Formation of Inorganic Thin Film Layer

Next, on the coating layer face of the bilayer film obtained in the description (3), an inorganic thin film layer (composite oxide layer of silicon dioxide and aluminum oxide) was formed in the same manner as in the description (3) of Example 1-1 to obtain a trilayer film (plastic substrate film/coating layer/inorganic thin film layer). A thickness of the inorganic thin film layer ($SiO_2/Al_2O_3$ composite oxide layer) in the trilayer film obtained was 13 nm. The composition of this composite oxide layer was $SiO_2/Al_2O_3$ (mass ratio)=60/40.

(5) Formation of Protection Layer

Next, on the inorganic thin film layer of the trilayer film obtained as the description (4), the coating liquid 2 (resin composition A for protection layers) prepared as the description (2) was applied in such a coating amount after drying as to be 0.3 g/m² (dry) and thereafter dried at 120° C. to form a protection layer.

In the above-mentioned manner, a multilayer film of the present invention having a coating layer, an inorganic thin film layer and a protection layer on a substrate film was obtained. For the obtained multilayer film, ink transfer property, oxygen permeability and lamination strength were evaluated by the following methods. The results are shown in Table 3.

<Production of Laminate Multilayer Body B for Evaluation>

A printing layer was formed on the protection layer of each of the multilayer films obtained in Examples 2-1 to 2-10 and Comparative Examples 2-1 to 2-8 by using an ink (New LP Super White, manufactured by Toyo Ink Manufacturing Co., Ltd.) with a gravure printing machine. A nylon film having a thickness of 15 μm (N1100, manufactured by Toyobo Co., Ltd.) was stuck to the obtained printing layer by using a urethane-based two-component curable adhesive (obtained by blending "Takelac A525S" with "Takenate A50"(manufactured by Mitsui Chemicals Inc.) at 13.5:1 (mass ratio)) in a dry laminate method, then an un-stretched polypropylene film having a thickness of 70 μm (P1147, manufactured by Toyobo Co., Ltd.) as a heat sealing resin layer was stuck on the above nylon film by using the same urethane-based 2-component curable adhesive in the dry lamination method, and the resulting multilayer film was aged at 40° C. for 4 days to obtain a laminate gas-barrier multilayer body for evaluation (hereinafter, sometimes referred to as laminate multilayer body B). All of adhesive layers formed by using the urethane-based two-component curable adhesive had a thickness of about 4 μm after drying.

<Method for Evaluation of Ink Transfer Property)

For the laminate multilayer body B produced in the above-mentioned manner, the dots of the ink in the printing layer were observed with eyes from a point above the un-stretched polypropylene film. On the other hand, as a control, a printing layer was formed in the same manner as described in <Production of laminate multilayer body B for evaluation> on the inorganic thin film layer of a multilayer film obtained in the same manner as in each of the Examples and Comparative Examples, except that no protection layer was formed, the nylon film and the un-stretched polypropylene film were stuck thereto to obtain a laminate multilayer body, and for the laminate multilayer body, the spreading extent of the dots of the ink in the printing layer was observed in the same manner as described above. The spreading extents of the dots (dot density) of both were compared and evaluated according to the following standard. The ink transfer property evaluation is based on that if the solvent resistance of the protection layer is low, the applied ink tends to be absorbed in the protection layer and as a result, the spreading in the transverse direction (in plane direction) in the protection layer plane is narrower (dot concentration tends to be low) and on the other hand if the solvent resistance of the protection layer is high, the applied ink is hardly absorbed in the protection layer and as a result, the spreading in the transverse direction (in plane direction) in the protection layer plane is wider (dot concentration tends to be high), and it can be a scale for indicating the durability of the protection layer to the solvent in the gravure ink.

⊚: Spreading of dots with a size equal to that in the case of no protection layer (control).

○: Spreading is wide although inferior as compared with that in the case of no protection layer (control).

Δ: Spreading is apparently narrow as compared with that in the case of no protection layer (control) and decrease in apparent dot density is significant.

<Method for Evaluation of Oxygen Permeability>

According to an electrolytic sensor method in JIS-K7126-2 (appendix A), each laminate multilayer body B produced in the above-mentioned manner was subjected to oxygen permeability measurement in normal state under an atmosphere represented by a temperature of 23° C. and a humidity of 65% RH by using an oxygen permeability measurement apparatus (OX-TRAN 2/20, manufactured by MOCON). The oxygen permeability measurement was carried out in the direction of permeating each laminate multilayer body from the substrate film side to the heat sealing resin layer side with oxygen.

On the other hand, each laminate multilayer body B produced in the above-mentioned manner was subjected to a retort treatment by keeping the laminate multilayer body in pressurized hot water having a temperature of 131° C. for 30 minutes and dried at 40° C. for 24 hours and the obtained laminate multilayer body after the retort treatment was subjected to oxygen permeability measurement (after retort treatment) in the same manner as described above.

<Method for Evaluation of Lamination Strength>

The laminate multilayer body B produced in the above-mentioned manner was subjected to a retort treatment by keeping the laminate multilayer body in pressurized hot water having a temperature of 131° C. for 30 minutes, immediately after the retort treatment, the obtained laminate multilayer body after the retort treatment was cut into a size of 15 mm in width and 200 mm in length to obtain a test piece, and the lamination strength was measured in conditions of a temperature of 23° C. and a relative humidity of 65% by using a Tensilon universal material testing machine (Tensilon UMT-II-500 model, manufactured by Toyo Baldwin Corp.). Water was applied to between the gas-barrier multilayer film layer (protection layer of each of the multilayer films obtained in Examples and Comparative Examples) and the printing layer, and then the strength at the time of peeling the layers at a peeling angle of 90 degrees was measured with a tensile speed adjusted to 200 mm/minute.

Examples 2-2 to 2-8 and Comparative Examples 2-1 to 2-4

Multilayer films were produced in the same manner as in Example 2-1, except that the use amounts of the respective materials were changed so as to give the mass ratios (on the basis of conversion into solid matter) of the oxazoline group-containing resin, acrylic resin and urethane resin as shown in Table 2 (at that time, the ratio of isopropanol in the entire amount of the coating liquid 1 was adjusted to 5.00% by mass as same as in Example 2-1) at the time of preparing the coating liquid 1 (resin composition for coating layer), or that the coating amount of the coating liquid 1 was changed so as to give the thickness of the coating layer as shown in Table 2, and ink transfer property, oxygen permeability and lamination strength were evaluated. The results are shown in Table 3.

Examples 2-9 and 2-10 and Comparative Examples 2-5 and 2-6

Multilayer films were produced in the same manner as in Example 2-1, except that the poly(methacrylic acid) solution and the polyurethane-urea resin solution were mixed in a mass ratio (on the basis of conversion into solid matter) of the poly(methacrylic acid) and the polyurethane-urea resin as shown in Table 2 at the time of preparing the coating liquid 2 (resin composition A for protection layers), and ink transfer property, oxygen permeability and lamination strength were evaluated. The results are shown in Table 3.

Comparative Example 2-7

A multilayer film was produced in the same manner as in Example 2-1, except that the crosslinking agent (epoxy-based curing agent and silane coupling agent) was not added at the time of preparing the coating liquid 2 (resin composition A for protection layers), and ink transfer property, oxygen permeability and lamination strength were evaluated. The results are shown in Table 3.

Comparative Example 2-8

A multilayer film was produced in the same manner as in Example 2-1, except that no coating layer was formed on the substrate film, and ink transfer property, oxygen permeability and lamination strength were evaluated. The results are shown in Table 3.

TABLE 2

| | Coating layer | | | | | | protection layer | |
|---|---|---|---|---|---|---|---|---|
| | Type of urethane resin | Type of acrylic resin | Type of oxazoline group-containing resin | Urethane resin/ acrylic resin/ oxazoline group-containing resin (mass ratio) | (P1/P2)/D (nm$^{-1}$) | Thickness (D) (nm) | polymethacrylic acid/ polyurethane-urea resin (mass ratio) | epoxy-based curing agent/ silane coupling agent |
| Example 2-1 | (C-1) | (B-1) | (A-2) | 20/30/50 | 0.059 | 50 | 50/50 | used |
| Example 2-2 | — | (B-1) | (A-2) | 0/50/50 | 0.060 | 50 | 50/50 | used |
| Example 2-3 | — | (B-1) | (A-1) | 0/50/50 | 0.038 | 50 | 50/50 | used |
| Example 2-4 | (C-1) | (B-1) | (A-2) | 20/30/50 | 0.053 | 100 | 50/50 | used |
| Example 2-5 | (C-1) | (B-1) | (A-2) | 20/30/50 | 0.052 | 150 | 50/50 | used |
| Example 2-6 | (C-1) | (B-1) | (A-2) | 20/30/50 | 0.104 | 10 | 50/50 | used |
| Example 2-7 | (C-1) | (B-1) | (A-2) | 20/50/30 | 0.039 | 50 | 50/50 | used |
| Example 2-8 | (C-1) | (B-1) | (A-2) | 10/50/40 | 0.050 | 50 | 50/50 | used |
| Example 2-9 | (C-1) | (B-1) | (A-2) | 20/30/50 | 0.059 | 50 | 90/10 | used |
| Example 2-10 | (C-1) | (B-1) | (A-2) | 20/30/50 | 0.059 | 50 | 10/90 | used |
| Comparative Example 2-1 | (C-1) | (B-1) | (A-2) | 20/50/30 | 0.031 | 200 | 50/50 | used |
| Comparative Example 2-2 | — | — | (A-2) | 0/0/100 | 0.110 | 50 | 50/50 | used |
| Comparative Example 2-3 | (C-1) | (B-1) | (A-2) | 40/50/10 | 0.018 | 50 | 50/50 | used |
| Comparative Example 2-4 | — | (B-1) | (A-2) | 0/10/90. | 0.201 | 5 | 50/50 | used |
| Comparative Example 2-5 | (C-1) | (B-1) | (A-2) | 20/30/50 | 0.059 | 50 | 100/0 | used |
| Comparative Example 2-6 | (C-1) | (B-1) | (A-2) | 20/30/50 | 0.059 | 50 | 0/100 | used |
| Comparative Example 2-7 | (C-1) | (B-1) | (A-2) | 20/30/50 | 0.059 | 50 | 50/50 | not used |
| Comparative Example 2-8 | | | — | | | | 50/50 | used |

TABLE 3

| | Evaluation | | | |
|---|---|---|---|---|
| | | Oxygen permeability (ml/m$^2$ · day · MPa) | | Lamination |
| | ink transfer property | Normal state | After retort treatment | strength (N/15 mm) |
| Example 2-1 | ◎ | 8 | 10 | 3.0 |
| Example 2-2 | ◎ | 8 | 7 | 3.0 |
| Example 2-3 | ◎ | 9 | 13 | 3.5 |
| Example 2-4 | ◎ | 7 | 9 | 3.5 |
| Example 2-5 | ◎ | 8 | 10 | 3.4 |
| Example 2-6 | ◎ | 9 | 9 | 3.2 |
| Example 2-7 | ◎ | 8 | 9 | 3.1 |
| Example 2-8 | ◎ | 8 | 8 | 3.1 |
| Example 2-9 | ◎ | 8 | 10 | 3.0 |
| Example 2-10 | ○ | 8 | 10 | 3.0 |
| Comparative Example 2-1 | ◎ | 8 | 19 | 3.0 |
| Comparative Example 2-2 | ◎ | 7 | 20 | 3.0 |
| Comparative Example 2-3 | ◎ | 10 | 29 | 1.5 |
| Comparative Example 2-4 | ◎ | 6 | 19 | 3.5 |
| Comparative Example 2-5 | ◎ | 18 | 22 | 1.4 |
| Comparative Example 2-6 | Δ | 8 | 10 | 1.0 |

TABLE 3-continued

| | Evaluation | | | |
|---|---|---|---|---|
| | | Oxygen permeability $(ml/m^2 \cdot day \cdot MPa)$ | | Lamination |
| | ink transfer property | Normal state | After retort treatment | strength (N/15 mm) |
| Comparative Example 2-7 | ⊚ | 8 | 10 | 1.2 |
| Comparative Example 2-8 | ⊚ | 10 | 34 | 1.2 |

Example 3-1

(1) Preparation of Coating Liquid 1 (Resin Composition for Coating Layers)

A coating liquid (resin composition for coating layers) was produced in the same manner as in the description (1) of Example 1-1. The mass ratios (based on conversion into solid matter) of the oxazoline group-containing resin, acrylic resin and urethane resin in the obtained coating liquid were as shown in Table 4.

(2) Preparation of Coating Liquid 2 (Resin Composition B for Protection Layers)

A polyester solution was prepared by dissolving 25 parts by mass of a polyester resin (polyester comprising terephthalic acid, isophthalic acid, ethylene glycol and propylene glycol as main ingredients) having a weight average molecular weight of 35,000 in 35 parts by mass of propyl acetate and 40 parts by mass of ethyl acetate. The polyester solution was mixed with ethyl acetate, propyl acetate, and polyisocyanate having an isocyanate group (Coronate L, manufactured by Nippon Polyurethane Industry Co., Ltd.) at the following blending ratios to produce the coating liquid 2 (resin composition B for protection layers).

| Ethyl acetate | 42.50% by mass |
|---|---|
| Propyl acetate | 44.20% by mass |
| Polyester solution | 12.00% by mass |
| Polyisocyanate | 1.30% by mass |

(3) Production of Polyester Substrate Film and Formation of Coating Layer

A bilayer film (plastic substrate film/coating layer) having a biaxially stretched polyester film (plastic substrate film) having a thickness of 12 μm and a coating layer on one face of the polyester film was obtained in the same manner as in the description (2) of Example 1-1 by using the coating liquid 1 (resin composition for coating layers) prepared in the in the above description (1).

This bilayer film was subjected to total reflection infrared absorption spectrometry and thickness measurement. The results are shown in Table 4.

(4) Formation of Inorganic Thin Film Layer

Next, on the coating layer face of the bilayer film obtained in the description (3), an inorganic thin film layer (composite oxide layer of silicon dioxide and aluminum oxide) was formed in the same manner as in the description (3) of Example 1-1 to obtain a trilayer film (plastic substrate film/coating layer/inorganic thin film layer). A thickness of the inorganic thin film layer ($SiO_2/Al_2O_3$ composite oxide layer) in the trilayer film obtained was 13 nm. The composition of this composite oxide layer was $SiO_2/Al_2O_3$ (mass ratio)=60/40.

(5) Formation of Protection Layer

Next, on the inorganic thin film layer of the trilayer film obtained as the description (4), the coating liquid 2 (resin composition for protection layers B) prepared as the description (2) was applied in such a coating amount after drying as to be 0.3 g/m² (dry) and thereafter dried at 120° C. to form a protection layer.

In the above-mentioned manner, a multilayer film of the present invention having a coating layer, an inorganic thin film layer and a protection layer on a substrate film was obtained. For the obtained multilayer film, ink transfer property, oxygen permeability and lamination strength were evaluated by the following methods. The results are shown in Table 5.

<Production of Laminate Multilayer Body C for Evaluation>

A printing layer was formed on the protection layer of each of the multilayer films obtained in Examples 3-1 to 3-12 and Comparative Examples 3-1 to 3-7 by using an ink (New LP Super White, manufactured by Toyo Ink Manufacturing Co., Ltd.) with a gravure printing machine. A laminate gas-barrier multilayer body for evaluation (hereinafter, sometimes referred to as laminate multilayer body C) was obtained by sticking an un-stretched polypropylene film having a thickness of 70 μm (P1147, manufactured by Toyobo Co., Ltd.) as a heat sealing resin layer to the obtained printing layer by using a urethane-based two-component curable adhesive in the dry lamination method, and carrying out aging at 40° C. for 4 days. All of adhesive layers formed by using the urethane-based 2-component curable adhesive had a thickness of about 4 μm after drying.

<Method for Evaluation of Ink Transfer Property>

For the laminate multilayer body C produced in the above-mentioned manner, the dots of the ink in the printing layer were observed with eyes from a point above the un-stretched polypropylene film. On the other hand, as a control, a printing layer was formed in the same manner as described in <Production of laminate multilayer body C for evaluation> on the inorganic thin film layer of a multilayer film obtained in the same manner as in each of the Examples and Comparative Examples, except that no protection layer was formed, the nylon film and the un-stretched polypropylene film were stuck thereto to obtain a laminate multilayer body, and for the laminate multilayer body, the spreading extent of the dots of the ink in the printing layer was observed in the same manner as described above. The spreading extents of the dots (dot density) of both were compared and evaluated according to the following standard. The ink transfer property evaluation is based on that if the solvent resistance of the protection layer is low, the applied ink tends to be absorbed in the protection layer and as a result, the spreading in the transverse direction (in plane direction) in the protection layer plane is narrower (dot concentration tends to be low) and on the other hand if the solvent resistance of the protection layer is high, the applied ink is hardly absorbed in the protection layer and as a result, the spreading in the transverse direction (in plane direction) in the protection layer plane is wider (dot concentration tends to be high), and it can be a scale for indicating the durability of the protection layer to the solvent in the gravure ink.

⊚: Spreading of dots with a size equal to that in the case of no protection layer (control).

○: Spreading is wide although inferior as compared with that in the case of no protection layer (control).

Δ: Spreading is apparently narrow as compared with that in the case of no protection layer (control) and decrease in apparent dot density is significant.

<Method for Evaluation of Oxygen Permeability>

According to an electrolytic sensor method in JIS-K7126-2 (appendix A), each laminate multilayer body C produced in the above-mentioned manner was subjected to oxygen permeability measurement in normal state under an atmosphere represented by a temperature of 23° C. and a humidity of 65% RH by using an oxygen permeability measurement apparatus (OX-TRAN 2/20, manufactured by MOCON). The oxygen permeability measurement was carried out in the direction of permeating each laminate multilayer body from the substrate film side to the heat sealing resin layer side with oxygen.

On the other hand, each laminate multilayer body C produced in the above-mentioned manner was subjected to a retort treatment by keeping the laminate multilayer body in pressurized hot water having a temperature of 130° C. for 30 minutes and dried at 40° C. for 24 hours and the obtained laminate multilayer body after the retort treatment was subjected to oxygen permeability measurement (after retort treatment) in the same manner as described above.

<Method for Evaluation of Lamination Strength>

The laminate multilayer body C produced in the above-mentioned manner was subjected to a retort treatment by keeping the laminate multilayer body in pressurized hot water having a temperature of 131° C. for 30 minutes, immediately after the retort treatment, the obtained laminate multilayer body after the retort treatment was cut into a size of 15 mm in width and 200 mm in length to obtain a test piece, and the lamination strength was measured in conditions of a temperature of 23° C. and a relative humidity of 65% by using a Tensilon universal material testing machine (Tensilon UMT-II-500 model, manufactured by Toyo Baldwin Corp.). Water was applied to between the gas-barrier multilayer film layer (protection layer of each of the multilayer films obtained in Examples and Comparative Examples) and the printing layer, and then the strength at the time of peeling the layers at a peeling angle of 90 degrees was measured with a tensile speed adjusted to 200 mm/minute.

Examples 3-2 to 3-8 and Comparative Examples 3-1 to 3-4

Multilayer films were produced in the same manner as in Example 3-1, except that the use amounts of the respective materials were changed so as to give the mass ratios (on the basis of conversion into solid matter) of the oxazoline group-containing resin, acrylic resin and urethane resin as shown in Table 4 (at that time, the ratio of isopropanol in the entire amount of the coating liquid 1 was adjusted to 5.00% by mass as same as in Example 3-1) at the time of preparing the coating liquid 1 (resin composition for coating layer), or that the coating amount of the coating liquid 1 was changed so as to give the thickness of the coating layer as shown in Table 4, and ink transfer property, oxygen permeability and lamination strength were evaluated. The results are shown in Table 5.

Examples 3-9 and 3-10

Multilayer films were produced in the same manner as in Example 3-1, except that the polyester resin having weight average molecular weight as shown in Table 4 was used as the polyester resins at the time of preparing the coating liquid 2 (resin composition B for protection layers), and ink transfer property, oxygen permeability and lamination strength were evaluated. The results are shown in Table 5.

Examples 3-11 and 3-12

Multilayer films were produced in the same manner as in Example 3-1, except that the use ratio of $SiO_2$ and $Al_2O_3$ to be used as a vapor deposition source was adjusted so as to give the composition ($SiO_2/Al_2O_3$ (mass ratio)) of the composite oxide layer to be obtained as shown in Table 4 at the time of forming the inorganic thin film layer, and ink transfer property oxygen permeability, and lamination strength were evaluated. The results are shown in Table 5.

Comparative Example 3-5

A multilayer film was produced in the same manner as in Example 3-1, except that polyisocyanate was not comprised at the time of preparing the coating liquid 2 (resin composition B for protection layers), and ink transfer property, oxygen permeability and lamination strength were evaluated. The results are shown in Table 5.

Comparative Example 3-6

A multilayer film was produced in the same manner as in Example 3-1, except that the polyester resin having weight average molecular weight as shown in Table 4 was used as the polyester resin at the time of preparing the coating liquid 2 (resin composition B for protection layers), and ink transfer property, oxygen permeability and lamination strength were evaluated. The results are shown in Table 5.

Comparative Example 3-7

A multilayer film was produced in the same manner as in Example 3-1, except that no coating layer was formed on the substrate film, and ink transfer property, oxygen permeability and lamination strength were evaluated. The results are shown in Table 5.

TABLE 4

| | Coating layer | | | | | | protection layer | | |
| | | | | | | | inorganic thin film layer $SiO_2/Al_2O_3$ (mass ratio) | Weight average molecular weight of polyester resin | |
| | Type of urethane resin | Type of acrylic resin | Type of oxazoline group-containing resin | Urethane resin/ acrylic resin/ oxazoline group-containing resin (mass ratio) | (P1/P2)/D (nm$^{-1}$) | Thickness (D) (nm) | | | Polyisocyanate |
|---|---|---|---|---|---|---|---|---|---|
| Example 3-1 | (C-1) | (B-1) | (A-2) | 20/30/50 | 0.059 | 50 | 60/40 | 35000 | used |
| Example 3-2 | — | (B-1) | (A-2) | 0/50/50 | 0.060 | 50 | 60/40 | 35000 | used |

TABLE 4-continued

| | Coating layer | | | | | | protection layer | | |
|---|---|---|---|---|---|---|---|---|---|
| | Type of urethane resin | Type of acrylic resin | Type of oxazoline group-containing resin | Urethane resin/ acrylic resin/ oxazoline group-containing resin (mass ratio) | (P1/P2)/D (nm$^{-1}$) | Thickness (D) (nm) | inorganic thin film layer SiO$_2$/Al$_2$O$_3$ (mass ratio) | Weight average molecular weight of polyester resin | Polyisocyanate |
| Example 3-3 | — | (B-1) | (A-1) | 0/50/50 | 0.038 | 50 | 60/40 | 35000 | used |
| Example 3-4 | (C-1) | (B-1) | (A-2) | 20/30/50 | 0.053 | 100 | 60/40 | 35000 | used |
| Example 3-5 | (C-1) | (B-1) | (A-2) | 20/30/50 | 0.052 | 150 | 60/40 | 35000 | used |
| Example 3-6 | (C-1) | (B-1) | (A-2) | 20/30/50 | 0.104 | 10 | 60/40 | 35000 | used |
| Example 3-7 | (C-1) | (B-1) | (A-2) | 20/50/30 | 0.039 | 50 | 60/40 | 35000 | used |
| Example 3-8 | (C-1) | (B-1) | (A-2) | 10/50/40 | 0.050 | 50 | 60/40 | 35000 | used |
| Example 3-9 | (C-1) | (B-1) | (A-2) | 20/30/50 | 0.059 | 50 | 60/40 | 25000 | used |
| Example 3-10 | (C-1) | (B-1) | (A-2) | 20/30/50 | 0.059 | 50 | 60/40 | 39000 | used |
| Example 3-11 | (C-1) | (B-1) | (A-2) | 20/30/50 | 0.059 | 50 | 50/50 | 35000 | used |
| Example 3-12 | (C-1) | (B-1) | (A-2) | 20/30/50 | 0.059 | 50 | 40/60 | 35000 | used |
| Comparative Example 3-1 | (C-1) | (B-1) | (A-2) | 20/50/30 | 0.031 | 200 | 60/40 | 35000 | used |
| Comparative Example 3-2 | — | — | (A-2) | 0/0/100 | 0.110 | 50 | 60/40 | 35000 | used |
| Comparative Example 3-3 | (C-1) | (B-1) | (A-2) | 40/50/10 | 0.018 | 50 | 60/40 | 35000 | used |
| Comparative Example 3-4 | — | (B-1) | (A-2) | 0/10/90 | 0.201 | 5 | 60/40 | 35000 | used |
| Comparative Example 3-5 | (C-1) | (B-1) | (A-2) | 20/30/50 | 0.059 | 50 | 60/40 | 35000 | not used |
| Comparative Example 3-6 | (C-1) | (B-1) | (A-2) | 20/30/50 | 0.059 | 50 | 60/40 | 1000 | used |

TABLE 5

| | Evaluation | | | |
|---|---|---|---|---|
| | ink transfer property | Oxygen permeability (ml/m$^2$ · day · MPa) | | Lamination strength (N/15 mm) |
| | | Normal state | After retort treatment | |
| Example 3-1 | ⊚ | 10 | 11 | 2.3 |
| Example 3-2 | ⊚ | 9 | 8 | 2.3 |
| Example 3-3 | ⊚ | 11 | 14 | 3.0 |
| Example 3-4 | ⊚ | 9 | 11 | 3.0 |
| Example 3-5 | ⊚ | 10 | 12 | 3.0 |
| Example 3-6 | ⊚ | 10 | 10 | 2.5 |
| Example 3-7 | ⊚ | 10 | 11 | 2.6 |
| Example 3-8 | ⊚ | 9 | 10 | 2.6 |
| Example 3-9 | ⊚ | 12 | 12 | 2.3 |
| Example 3-10 | ⊚ | 10 | 12 | 2.3 |
| Example 3-11 | ⊚ | 8 | 12 | 2.3 |
| Example 3-12 | ⊚ | 11 | 12 | 2.3 |
| Comparative Example 3-1 | ⊚ | 8 | 18 | 2.3 |
| Comparative Example 3-2 | ⊚ | 7 | 20 | 2.3 |
| Comparative Example 3-3 | ⊚ | 10 | 29 | 1.1 |
| Comparative Example 3-4 | ⊚ | 6 | 19 | 3.0 |
| Comparative Example 3-5 | Δ | 7 | 15 | 2.0 |
| Comparative Example 3-6 | ⊚ | 18 | 28 | 2.4 |
| Comparative Example 3-7 | ⊚ | 10 | 34 | 1.2 |

INDUSTRIAL APPLICABILITY

The present invention can provide a gas-barrier multilayer film excellent in gas-barrier properties and having good adhesion properties (lamination strength) without causing interlayer peeling not only in a normal state but also after a retort treatment. The gas-barrier multilayer film is easy to be produced, excellent in economical properties and production stability, and easy to obtain homogeneous properties. Accordingly, the gas-barrier multilayer film can be widely used not only for packaging retort foodstuffs but also for applications such as various foodstuffs, drugs and industrial products, as well as industrial applications such as solar cells, electronic paper, organic EL devices, and semiconductor devices.

The invention claimed is:

1. A multilayer film obtained by forming a crosslinked coating layer on at least one face of a polyester substrate film, wherein
said coating layer is formed from a resin composition comprising an oxazoline group-containing resin, an acrylic resin, and optionally a urethane resin, and has a thickness (D) of 10 to 150 nm,
a relation of the thickness (D) of the coating layer with a ratio (P1/P2) of a peak-intensity (P1) of the peak having an absorption maximum in a region of 1655±10 cm$^{-1}$ and a peak-intensity (P2) of the peak having an absorption maximum in a region of 1580±10 cm$^{-1}$ in a total reflection infrared absorption spectrum of the coating layer satisfies an equation of a formula 0.035≤ (P1/P2)/D≤0.104,
the oxazoline group-containing resin is present in an amount of 30 to 50% by mass, the acrylic resin is present in an amount of 30 to 50% by mass, and the urethane resin is present in an amount of 0 to 20% by mass based on 100% by mass in total of said oxazoline group-containing resin, said acrylic resin, and said urethane resin,
the oxazoline group-containing resin is a copolymer of 2-isopropenyl-2-oxazoline, methyl (meth)acrylate, and one or more unsaturated monomers comprising a polyethylene glycol chain, a composition mole ratio of 2-isopropenyl-2-oxazoline is 30 to 70 mol % in the oxazoline group-containing resin, the polyethylene glycol chain has a molecular weight of 300 g/mol to 700 g/mol, the acrylic resin comprises a carboxyl group and 40-95 mol % of alkyl (meth)acrylate and has an acid value of 1 to 4 mgKOH/g, the alkyl group in the alkyl (meth)acrylate of the acrylic resin is selected from methyl and ethyl, the urethane resin comprises a carboxyl group and has an acid value of 20 to 30 mgKOH/g, and the urethane resin is produced by reaction of a polyhydroxy compound comprising dimethylolpropionic acid and a polyisocyanate compound comprising alicyclic diisocyanate.

2. The multilayer film according to claim 1, wherein an inorganic thin film layer is laminated on said coating layer.

3. The multilayer film according to claim 1, wherein an inorganic thin film layer is laminated on said coating layer, a protection layer is further laminated on the inorganic thin film layer, and said protection layer is formed from a resin composition A comprising a polymer (a) of either a (meth)acrylic acid homopolymer or a (meth)acrylic acid/(meth) acrylic acid ester copolymer containing not less than 10% by mass of (meth)acrylic acid; a polyurethane-urea resin (b) having an ether bond; and at least one crosslinking agent (c) selected from epoxy resins, polyisocyanates, and silane coupling agents.

4. The multilayer film according to claim 1, wherein an inorganic thin film layer is laminated on said coating layer, a protection layer is further laminated on the inorganic thin film layer, and said protection layer is formed from a resin composition B comprising a polymer (d) having a weight-average molecular weight of 22,000 to 40,000 and a polyisocyanate (e).

5. The multilayer film according to claim 1, wherein the oxazoline group-containing resin in said resin composition has an amount of the oxazoline group of 4.3 to 8.0 mmol/g.

6. The multilayer film according to claim 1, wherein said resin composition comprises the urethane resin.

7. The multilayer film according to claim 2, wherein said inorganic thin film layer is a layer consisting of a composite oxide of silicon oxide and aluminum oxide.

8. The multilayer film according to claim 3, wherein the oxazoline group-containing resin in said resin composition has an amount of the oxazoline group of 4.3 to 8.0 mmol/g.

9. The multilayer film according to claim 8, wherein said resin composition comprises the urethane resin.

10. The multilayer film according to claim 8, wherein said inorganic thin film layer is a layer consisting of a composite oxide of silicon oxide and aluminum oxide.

11. The multilayer film according to claim 1, wherein the coating layer has a thickness (D) of 50 to 150 nm.

* * * * *